US011379788B1

(12) United States Patent
Wagner et al.

(10) Patent No.: US 11,379,788 B1
(45) Date of Patent: Jul. 5, 2022

(54) MULTILAYERED METHOD AND APPARATUS TO FACILITATE THE ACCURATE CALCULATION OF FREIGHT DENSITY, AREA, AND CLASSIFICATION AND PROVIDE RECOMMENDATIONS TO OPTIMIZE SHIPPING EFFICIENCY

(71) Applicant: FIDA, LLC, Pittsburgh, PA (US)

(72) Inventors: Michael Wagner, Pittsburgh, PA (US); Mark Raymond, Pittsburgh, PA (US); Terrance J. Henderson, II, Pittsburgh, PA (US); Christine Henderson, Pittsburgh, PA (US)

(73) Assignee: FIDA, LLC, Pittsburgh, PA (US)

( * ) Notice: Subject to any disclaimer, the term of this patent is extended or adjusted under 35 U.S.C. 154(b) by 479 days.

(21) Appl. No.: 16/379,936

(22) Filed: Apr. 10, 2019

Related U.S. Application Data

(60) Provisional application No. 62/743,185, filed on Oct. 9, 2018.

(51) Int. Cl.
  *G06Q 10/08* (2012.01)
  *G06F 17/18* (2006.01)
  *G06F 3/0486* (2013.01)

(52) U.S. Cl.
  CPC ..... *G06Q 10/08345* (2013.01); *G06F 3/0486* (2013.01); *G06F 17/18* (2013.01)

(58) Field of Classification Search
  None
  See application file for complete search history.

(56) References Cited

U.S. PATENT DOCUMENTS 5,719,678 A  2/1998 Reynolds et al.
5,832,417 A * 11/1998 Petrucelli ............... G01G 23/01
                                                         702/101

(Continued)

FOREIGN PATENT DOCUMENTS

EP  2145286 B1  12/2010
EP  2439587 A1   4/2012

(Continued)

OTHER PUBLICATIONS

Marc Wojnowich, Freight Classifications—Does the "Density Effect" have you confused?, Nov. 11, 2017, Recon Logistics, pp. 1-6 (accessed Apr. 11, 2022) (Year: 2017).*

(Continued)

*Primary Examiner* — Emmett K. Walsh
*Assistant Examiner* — Larita L. Yusuf
(74) *Attorney, Agent, or Firm* — K&L Gates LLP

(57) ABSTRACT

Systems and methods provide real-time shipping optimization recommendations for reducing the cost of shipping freight units in a shipment. System comprises a measurement system in communication with a computer system that comprises a client computer device in communication with a host computer system. The measurement system comprises multiple sensing devices to determine weight, dimensions, and other shipping parameters of the freight units in the shipment. The computer system computes a current shipping cost and density based on the shipping parameters. The computer system determines shipping recommendations including recommended adjustments to the shipping parameters that reduce the current shipping cost. The shipping recommendations are transmitted to the client computer device prior to loading the shipment onto a carrier vehicle for the shipment.

18 Claims, 9 Drawing Sheets

(56) References Cited

U.S. PATENT DOCUMENTS

| | | | |
|---|---|---|---|
| 5,946,662 A | 8/1999 | Ettl et al. | |
| 6,177,999 B1 | 1/2001 | Wurz et al. | |
| 6,614,928 B1 | 9/2003 | Chung et al. | |
| 6,851,610 B2 | 2/2005 | Knowles et al. | |
| 6,923,374 B2 | 8/2005 | Knowles et al. | |
| 6,959,868 B2 | 11/2005 | Tsikos et al. | |
| 7,131,586 B2 | 11/2006 | Tsikos et al. | |
| 7,161,688 B1 | 1/2007 | Bonner et al. | |
| 7,167,583 B1 | 1/2007 | Lipson et al. | |
| 7,277,187 B2 * | 10/2007 | Smith | G01B 11/00 |
| | | | 340/928 |
| 7,321,859 B2 * | 1/2008 | Cooper | G01B 11/04 |
| | | | 702/159 |
| 7,761,337 B2 | 7/2010 | Caballero et al. | |
| 7,764,388 B2 | 7/2010 | Addy | |
| 7,783,534 B2 | 8/2010 | Armstrong et al. | |
| 8,132,728 B2 | 3/2012 | Dwinell et al. | |
| 8,228,510 B2 | 7/2012 | Pangrazio et al. | |
| 8,285,731 B2 | 10/2012 | Peeters et al. | |
| 8,370,182 B2 | 2/2013 | Gupta et al. | |
| 8,571,915 B1 | 10/2013 | Wong et al. | |
| 8,645,216 B2 | 2/2014 | Murphy et al. | |
| 8,781,159 B2 | 7/2014 | Sones et al. | |
| 8,838,577 B2 | 9/2014 | Sukhwani et al. | |
| 8,842,304 B2 | 9/2014 | Muramoto | |
| 8,908,995 B2 | 12/2014 | Benos et al. | |
| 9,213,953 B1 | 12/2015 | Kassmann et al. | |
| 9,234,782 B2 | 1/2016 | Laffargue et al. | |
| 9,239,950 B2 | 1/2016 | Fletcher | |
| 9,292,969 B2 | 3/2016 | Laffargue et al. | |
| 9,464,885 B2 | 10/2016 | Lloyd et al. | |
| 9,557,166 B2 | 1/2017 | Thuries et al. | |
| 9,707,682 B1 | 7/2017 | Konolige et al. | |
| 9,727,840 B2 | 8/2017 | Bernhardt | |
| 9,732,929 B2 | 8/2017 | Kürpick et al. | |
| 9,747,578 B2 | 8/2017 | Wagner | |
| 9,762,793 B2 | 9/2017 | Ackley et al. | |
| 9,779,276 B2 | 10/2017 | Todeschini et al. | |
| 9,779,546 B2 | 10/2017 | Hunt et al. | |
| 9,784,566 B2 | 10/2017 | Laffargue | |
| 9,818,235 B1 | 11/2017 | Rotman et al. | |
| 9,826,213 B1 | 11/2017 | Russell et al. | |
| 9,826,220 B2 | 11/2017 | Laffargue et al. | |
| 9,897,424 B2 | 2/2018 | Sorensen et al. | |
| 9,897,434 B2 | 2/2018 | Ackley et al. | |
| 9,898,833 B1 | 2/2018 | Jankevics et al. | |
| 9,940,721 B2 | 4/2018 | Lloyd et al. | |
| 9,959,628 B2 | 5/2018 | Mutti et al. | |
| 9,976,848 B2 | 5/2018 | Li et al. | |
| 9,979,276 B2 | 5/2018 | Chang | |
| 9,990,535 B2 | 6/2018 | Phillips et al. | |
| 10,007,266 B2 | 6/2018 | Fischer et al. | |
| 10,007,858 B2 * | 6/2018 | Bremer | G01B 11/02 |
| 2002/0007353 A1 * | 1/2002 | Kornacki | G06Q 10/04 |
| | | | 705/400 |
| 2006/0067572 A1 | 3/2006 | White et al. | |
| 2007/0038673 A1 | 2/2007 | Broussard et al. | |
| 2007/0103460 A1 * | 5/2007 | Zhang | G06T 7/246 |
| | | | 345/419 |
| 2007/0237356 A1 | 10/2007 | Dwinell et al. | |
| 2009/0234756 A1 * | 9/2009 | Omatsu | G07G 1/0054 |
| | | | 705/28 |
| 2009/0242450 A1 * | 10/2009 | Zhang | B65D 81/03 |
| | | | 206/522 |
| 2009/0323084 A1 * | 12/2009 | Dunn | G06K 7/10861 |
| | | | 356/635 |
| 2011/0218926 A1 | 9/2011 | Addala et al. | |
| 2012/0057022 A1 | 3/2012 | Nechiporenko et al. | |
| 2013/0329013 A1 | 12/2013 | Metois et al. | |
| 2014/0031965 A1 | 1/2014 | Sun et al. | |
| 2014/0214492 A1 | 7/2014 | Bergerson et al. | |
| 2014/0351073 A1 | 11/2014 | Murphy et al. | |
| 2014/0372182 A1 | 12/2014 | Groble et al. | |
| 2014/0379613 A1 | 12/2014 | Nishitani et al. | |
| 2015/0042791 A1 | 2/2015 | Metois et al. | |
| 2015/0276379 A1 | 10/2015 | Ni et al. | |
| 2016/0009508 A1 * | 1/2016 | Gaikoski | G06Q 50/28 |
| | | | 414/800 |
| 2016/0090283 A1 | 3/2016 | Svensson et al. | |
| 2016/0227193 A1 * | 8/2016 | Osterwood | G03B 17/55 |
| 2016/0249039 A1 | 8/2016 | Tran et al. | |
| 2016/0363990 A1 | 12/2016 | Key | |
| 2017/0018094 A1 | 1/2017 | Todeschini | |
| 2017/0024896 A1 | 1/2017 | Houghton et al. | |
| 2017/0061376 A1 * | 3/2017 | Wagner | G06Q 10/0838 |
| 2017/0091957 A1 | 3/2017 | Driegen et al. | |
| 2017/0217620 A1 | 8/2017 | Zeilstra | |
| 2017/0228885 A1 | 8/2017 | Baumgartner | |
| 2017/0320437 A1 | 11/2017 | Liebau et al. | |
| 2018/0025552 A1 | 1/2018 | Cano | |
| 2018/0033214 A1 | 2/2018 | Ackley | |
| 2018/0053305 A1 | 2/2018 | Gu et al. | |
| 2018/0143003 A1 | 5/2018 | Clayton et al. | |
| 2018/0165824 A1 | 6/2018 | Ackley et al. | |
| 2018/0178667 A1 | 6/2018 | Cumoli et al. | |
| 2018/0197139 A1 | 7/2018 | Hill | |

FOREIGN PATENT DOCUMENTS

| | | | | |
|---|---|---|---|---|
| EP | 2439487 B1 | | 8/2012 | |
| EP | 2 722 656 A1 * | | 4/2014 | G01G 19/414 |
| JP | 4014559 B2 | | 11/2007 | |
| WO | WO-2007115256 A2 * | | 10/2007 | B65B 55/20 |
| WO | WO 2008/154611 A2 | | 12/2008 | |
| WO | WO 2011/017241 A1 | | 2/2011 | |
| WO | WO 2014/139464 A1 | | 9/2014 | |
| WO | WO-2014152670 A2 * | | 9/2014 | G06Q 10/08 |
| WO | WO 2014/203025 A1 | | 12/2014 | |
| WO | WO 2017/024347 A1 | | 2/2017 | |
| WO | WO 2017/036756 A1 | | 3/2017 | |
| WO | WO 2017/042747 A2 | | 3/2017 | |

OTHER PUBLICATIONS

Xiao et al., "Pallet recognition and localization using an RGB-D camera", International Journal of Advanced Robotic Systems, Nov.-Dec. 2017: 1-10, 10 pages.

3D Image Sensing Using Smart Pixel Technology, ifm efector North America, 2009, 6 pages.

Özgür et al., "Comparing sensor-based and camera-based approaches to recognizing the occupancy status of the load handling device of forklift trucks", 2016 Logistics Journal: Proceedings, 9 pages.

Bostelman et al., "Visualization of Pallets", SPIE Optics East 2006 Conference, Boston, MA, USA, Oct. 1-4, 2006, 12 pages.

3D Time-of-Flight Sensors in Logistics, https://larrylisky.com/2017/03/31/3d-sensing-in-logistics/ accessed Aug. 15, 2018, 8 pages.

* cited by examiner

US 11,379,788 B1

MULTILAYERED METHOD AND APPARATUS TO FACILITATE THE ACCURATE CALCULATION OF FREIGHT DENSITY, AREA, AND CLASSIFICATION AND PROVIDE RECOMMENDATIONS TO OPTIMIZE SHIPPING EFFICIENCY

PRIORITY CLAIM

The present application claims priority to U.S. provisional patent application Ser. No. 62/743,185, filed Oct. 9, 2018, with the same title and inventors as indicated above, and which is incorporated herein by reference in its entirety.

BACKGROUND

Freight carriers shipping freight units use pricing rules that consider shipment characteristics such as density, linear footage, and volume. Some shippers use generic rating systems that provide pricing for multiple carriers based only on the total weight and class of the shipment without accounting for the shipment density or dimensions or other rules that are less common or very obscure but cause a shipper to incur expensive surcharges. Accounting for the shipment density or dimensions can be used to reduce the cost of shipping freight units.

The freight industry is continuing to move to a specific pricing model for density-based freight, where the product type, as well as the dimensions and weight of the freight units, significantly impact the shipment costs. Accuracy of the dimensions is critical to properly calculate the cost in a density-based pricing model.

SUMMARY

In one general aspect, the present invention is directed to a sensor-based dimensionalizer system to determine the weight, dimensions, and other shipping parameters of freight units to be shipped in a shipping container or carrier vehicle by a freight carrier. The system also preferably comprises a computer-based recommendation engine that recommends adjustments to the weight and/or dimensions of a freight unit, or a group of freight units to be shipped, in order to advantageously affect the cost of shipping the freight unit(s). The recommended adjustments may be received or otherwise provided on a client computer device.

In another general aspect, the present invention is directed to a system comprising: a measurement system for determining shipping parameters of a shipment and a computer system that is in communication with the measurement system. The shipment comprises one or more freight units; each of the one or more freight units comprises one or more goods; the shipping parameters comprise a weight, height, width, and depth for each of the one or more freight units; and the measurement system comprises a depth camera, a scale, and a rangefinder. Range data from the rangefinder are used to calibrate the depth camera. The computer system comprises a client computer device; and a host computer system that is in communication with the client computer device. The computer system is configured to: compute a density for each of the one or more freight units in the shipment based on the shipping parameters; compute a shipping cost for shipping the shipment with a freight carrier based on carrier-specific pricing rules for the freight carrier, wherein computing the shipping cost for the freight carrier comprises determining, based on the carrier-specific pricing rules for the freight carrier, whether the freight carrier would designate the shipment as density-based or class-based for purposes of determining the shipping cost; determine, by the host computer system, an adjustment to the shipping parameters for the shipment that reduces the shipping cost by changing the density of the one or more freight units, wherein the adjustment comprises an increase in weight, height, width and/or depth of the one or more freight units; and transmit, by the host computer system to the client computer device, data about the adjustment prior to loading the shipment onto a carrier vehicle.

In yet another general aspect, the present invention is directed to a method comprising: determining, with a measurement system, shipping parameters for a shipment that comprises one or more freight unit; computing, by a computer system that comprises a host computer system and a client computer device, a density for each of the one or more freight units in the shipment based on the shipping parameters; computing, by the computer system, a shipping cost for shipping the shipment with a freight carrier based on carrier-specific pricing rules for the freight carrier; determining, by the computer system, an adjustment to the shipping parameters for the shipment that reduces the shipping cost by changing the density of the one or more freight units; and transmitting, by the computer system to the client computer device, data about the adjustment prior to loading the shipment onto a carrier vehicle. Each of the one or more freight units comprises one or more goods; the shipping parameters comprise a weight, height, width, and depth for each of the one or more freight units; and the measurement system comprises a depth camera, a scale, and a rangefinder. Range data from the rangefinder are used to calibrate the depth camera. Computing the shipping cost for the freight carrier comprises determining, based on the carrier-specific pricing rules for the freight carrier, whether the freight carrier would designate the shipment as density-based or class-based for purposes of determining the shipping cost. The determined adjustment comprises an increase in weight, height, width and/or depth of the one or more freight units.

These and other benefits of the present invention are apparent from the description herein.

FIGURES

Various embodiments of the present invention are described herein by way of example in connection with the following figures, wherein.

DESCRIPTION

Figure 1:
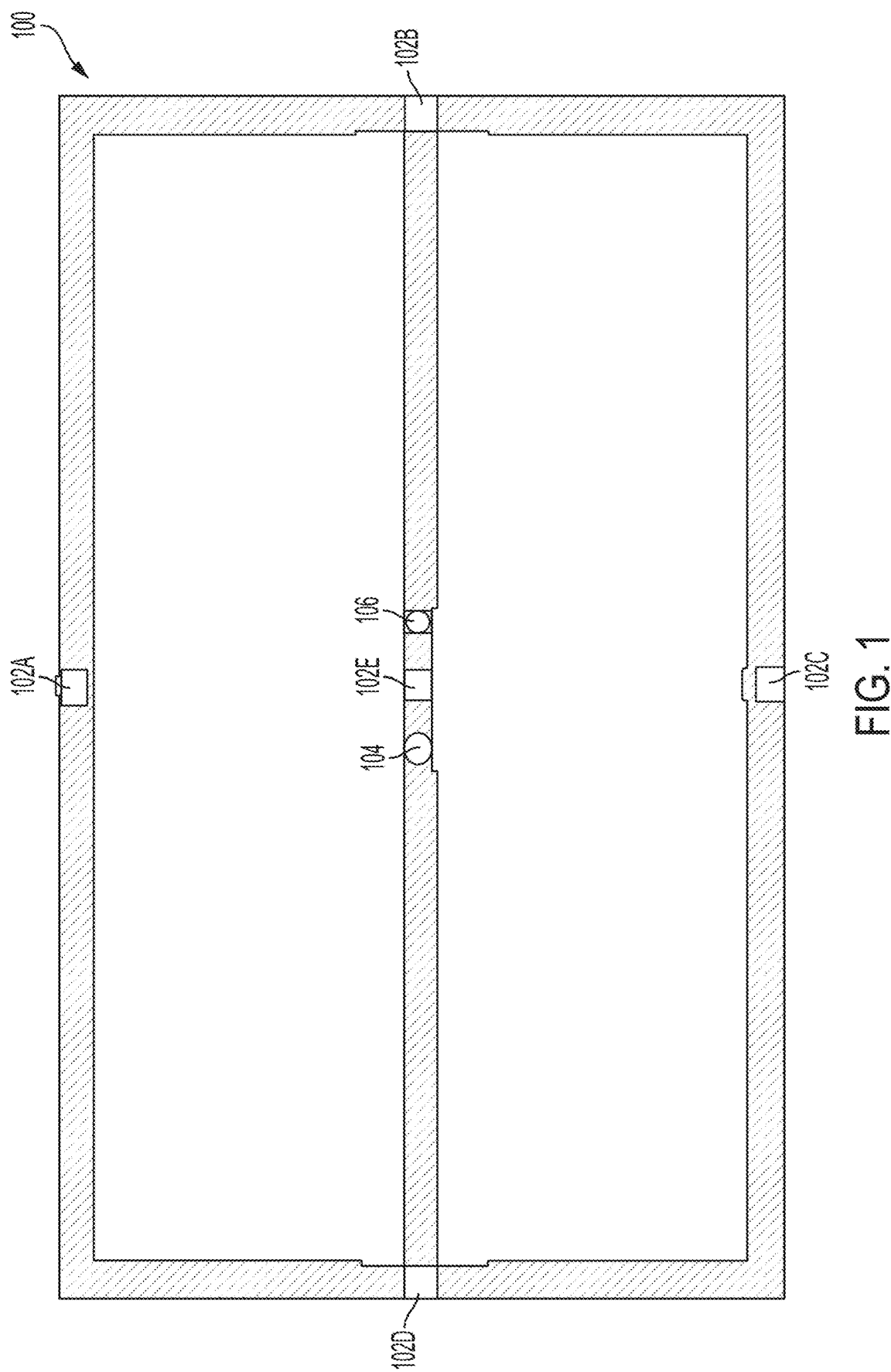
FIG. 1 is a top view of the sensing devices in the measurement system used to determine the dimensional and other shipping parameters of a freight unit in a shipment, according to various embodiments of the present invention.

The present invention is directed to, in one general aspect, a system to accurately measure the dimensions, weight, area and volume of freight units to be shipped, and to provide dynamic recommendations on how to adjust the shipping parameters (e.g., dimensions) of the freight units to positively affect the packaging, shipping, and other costs associated with shipping the freight units. The dynamic recommendations could be provided as marginal suggestions. For example, the system may recommend increasing the weight of a freight unit by x pounds, while only increasing the volume of the freight unit by y amount or less, to save z dollars. The z dollars of savings could be calculated based on a rate calculator that uses carrier-specific pricing rules to determine the cost of shipping. Because different carriers might use different pricing rules to determine the total price of transporting or shipping a shipment, the system may also determine when and how much cost to ship the shipment could be reduced by selecting a different carrier for that particular shipment. In this way, the dynamic recommendations of the system may comprise recommended adjustments to the shipping parameters of the shipment and/or freight units in the shipment. The adjusted shipping configuration (e.g., increasing the density of one or more freight units in the shipment) could correspond to a cheaper cost for shipping as calculated based on the applicable carrier specific pricing rule. Such rules may be broadly classified as density-based or class-based rules. The adjustment may also result in a transition in shipping cost/pricing rules, such as the change in shipping parameters resulting in changing the rules to deem the shipment as subject to density-based rules rather than class-based rules. Preferably, the system should determine the adjustment prior to loading the shipment onto a carrier vehicle, so that the user may realize the savings of the adjustment. Carrier vehicles may be box cars, trucks, ships, trains, airplanes, or some other suitable carrier vehicle as desired.

The dimensionalizer system may comprise a measurement system and computer system.

More specifically, the system could use an arrangement of sensing devices, which may constitute a measurement system for determining shipping parameters of a shipment. As used herein, a shipment comprises one or more freight units, in which each freight unit comprises one or more goods. The goods could be positioned on top of one or more pallets, if desired. The shipment parameters include dimensional parameters such as weight, height, width, and depth for the freight units. The sensing devices may include depth cameras, rangefinders, and a scale, or some combination or subcombination thereof. The scale could be co-located at the freight site where the shipment is located, or the scale could be located remotely. The range sensors may be various suitable rangefinders such as optical and acoustic rangefinders. Optical rangefinders might include diode lasers, laser emitting diodes (LEDs), lasers, or some other suitable optical energy device. Acoustic rangefinders may be ultrasound range sensors or some other suitable acoustic range device. The rangefinders may be used for improving the determination of the physical characteristics/parameters (shipping parameters) of the freight units as described below.

In particular, the sensing devices can be used to calculate the dimensions of the freight units in the shipment in order to provide real-time feedback on freight to optimize shipments. The sensing devices may obtain calibrated and aligned measurements to determine the shipping parameters, as discussed in more detail below. Thus, the sensing devices operate as part of the measurement system of the dimensionalizer system. The real-time feedback may be received and handled by a computer system in communication with the measurement system. This computer system might comprise a client component (e.g., client computer device such as a mobile smartphone) and a host component (e.g., host computer system). The feedback may comprise adjustments in the shipping parameters of a shipment that may beneficially reduce the cost of transporting/shipping the shipment. For example, the system may determine that changing, such as increasing, the density of the freight units in the shipment could reduce the overall shipping cost of shipping the shipment. To elaborate further, after computing the density of the freight units in the shipment, the computer system use applicable shipment/freight carrier specific pricing rules to determine the estimated shipping cost. The applicable rules could correspond to one or more different carriers, which in turn could be determined based on a client profile in a database of the dimensionalizer system. For instance, the client profile may specify the carriers that the client is willing to use to ship shipments.

Accordingly, when the adjustment comprises a recommendation to increase the density of the freight units, the host computer system could determine that an increase in one or more of weight, height, width and depth (or a change in some other shipping parameter, such as the type of product in the freight unit) to increase the density of one or more freight units is desirable and thus transmit this recommendation to the client computer device. The client computer device could display this adjustment or recommendation such that the client understands the existing recommended adjustments to shipping parameters, freight units, and shipments. As discussed above, if desirable, the freight units may comprise one or more pallets having one or more products/goods thereon. The multiple sensors of the measurement system may work in conjunction to determine multiple physical parameters of the freight unit, including the density, weight, height, length, width, area, pounds per cubic foot (PCF), product class and sub-classes. Collectively, these and other suitable parameters may be referenced as shipment parameters of the freight unit and/or shipment associated with the freight unit. Before the depth cameras and rangefinders initially begin acquiring data to measure and determine the shipping parameters, automated automatic registration, alignment, and calibration may occur. Such registration, alignment, and calibration can also occur throughout the measuring process. Each of the depth cameras, rangefinders and scales may be coupled to a processor (e.g., microprocessor, controller, field programmable gate array, digital signal processor) for processing the acquired data, to determine the shipping parameters, for example. In turn, the processor may be coupled to a memory device (e.g., RAM, ROM) for storing the acquired data.

The system may also include mobile devices (such as laptops, tablets, smartphones, body-wearable devices) for providing a freight management system with a corresponding user interface. In this connection, the client computer device may be a mobile device with a corresponding user interface. For example, the user interface could be provided by a display of the client computer device in order to display an annotated visualization of freight units, in which the annotated visualization indicates a confidence level of the determined shipping parameters. The annotated visualization could be displayed based on images and data captured by a depth camera. The images and data could be calibrated, refined, and registered using the rangefinders. In general, the data used to populate the corresponding user interface may be received from the processor coupled to the sensing devices. The provided freight management system (FMS) may be remote from the sensing devices in various embodiments. That is, the computer system communicatively coupled to the measurement system may be remote from the freight site of the shipment. Thus, the sensing devices can be located at the same location as the freight unit to be measured. The processor coupled to the sensing devices may transmit acquired data and measure shipping parameters of the shipment to the remote FMS, which may be part of the computer system or host computer system. To this end, the processor may constitute or be part of a local work station provided at the freight unit/shipment site to communicate with the FMS. The local work station may act as a local hub for communicating with the remote FMS via a suitable application programming interface (API). In other words, the local work station can route requests between the sensing devices and the remote FMS, which may be part of the computer system or host computer system.

The measurement, data, and determined shipping parameters are useful for storage and tracking of the freight units/shipment. Additionally, the remote FMS may be able to provide real-time recommendations regarding the freight unit configuration. In particular, the remote FMS may recommend different freight types (e.g., different classes of products) and standard inventory to be included in freight units as well as other adjustments to determined shipping parameters, in order to optimize the shipment of the freight units. For example, the remote FMS could recommend changing the density (which could be the total density of the shipment or individual density of a subset of freight units and can be measurable in pounds per square foot (PSF)), or reducing the number of freight units in a shipment from 4 pallets to 3 pallets for example, and/or adding sand (or some other dense, cheap material) to one or more freight units in the shipment in order to increase the corresponding density, which may reduce the overall shipping cost under the corresponding density-based rules used to determine shipping rate. In some situations, the recommended adjustment may be sufficient to trigger a different pricing rule. That is, the recommended adjustment might cause the corresponding carrier to switch from a class-based to a density-based pricing rule. Preferably, under the applicable pricing rule, the total shipping cost of shipping the shipment after the adjustment is lower than prior to the adjustment.

In sum, the dimensionalizer system comprises a layered technology framework that captures freight weight, dimensions, and other shipping parameters accurately. In this way, human error or manual intervention can be minimized and freight can be appropriately classified (e.g., under applicable shipping carrier classifications) so as to avoid unexpected freight charges. This precise and accurate information (e.g., capturing the images and dimensions of the freight units in the shipment) may be transmitted to the FMS, which can make recommendations on cost effective shipping alternatives for the corresponding class of freight. Dynamic recommendations may be provided based on freight site profiles. The freight site profiles could specify various preferences of the client seeking to ship the shipment. For example, the preferences could include: two different products/goods should generally be included in the same freight unit or shipment, a shipment should generally include x number of freight units, one or more particular carriers are preferred carriers with preferable client specific pricing rules, or other suitable preferences. The client/freight site profiles may be stored as database profiles in a database of the dimensionalizer system. The database may be maintained by one or more of the processor, local work station, or computer system. Specific on-site client shipment/freight unit information such as particular shipment type and additional shipment bandwidth, including both supply and distribution needs, may be incorporated so that customized dynamic adjustments or recommendations are generated according to the relevant database profile. Information from the dimensionalizer system can be used for real-time recommendations to optimize the shipping decision making process, including maximizing efficiency and minimizing cost. In this way, the computer system can provide live feedback and recommendations on the shipment.

The combination of multiple sensing devices/platforms and equipment in the measurement system may be beneficial for achieving greater accuracy. That is, the combination of depth cameras, rangefinders (e.g, laser diode and ultrasound), and scales obtains accurate measurements. Additionally or alternatively, the sensing devices monitor equipment operation and status states. For example, the sensing devices, in conjunction with the computer system, can determine when the shipping parameters are determined, when the freight units of the shipment are loaded into the carrier vehicle, and an error status of system components. Freight units can have a class according to a freight classification such as the National Motor Freight Classification (NMFC) or some other shipping carrier specific classification, which may include density-based classes. Accurately determining the NMFC of products and/or freight units is critical to proper classification and pricing of a shipment. If freight falls under a density-based NMFC, it is critical that the freight is accurately measured and weighted. The measurements from the multiple sensing devices can ensure accurate pricing is obtained by applying the appropriate sub-class within the NMFC. As a result, real-time decisions can be made on shipment capacity, options, shipment configuration, and pricing. This real-time support may be provided prior to shipping the shipment. The dimensionalizer system may avoid manual calculation of dimensional weight, which can be time consuming and error prone. Errors in calculated dimensions could cause additional carrier charges if reclassification occurs.

Therefore, the present invention relates to the use of sensing devices and a computer system to accurately measure the dimensions, weight, area, volume, and other shipping parameters of freight units and associated shipments in order to provide dynamic recommendations. Such recommendations include how to effectively maximize the amount of packaging in a shipment as well as minimizing the shipping and other costs associated with transporting the shipment of freight units.

Figure 6:
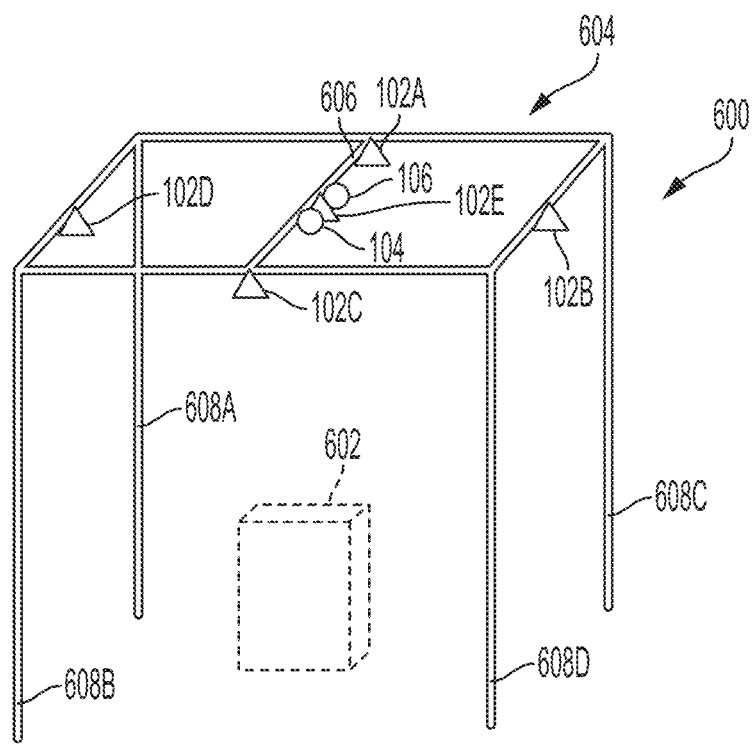
FIG. 6 is a schematic that shows the sensing devices mounted on an overhead mounting frame, according to various embodiments of the present invention.

FIG. 1 is a top view 100 of the sensing devices in the measurement system used to determine the dimensional and other shipping parameters of a freight unit in a shipment, according to various embodiments of the present invention. The system may also comprise a scale to measure the weight of a freight unit, as described in further detail below. This scale could be at the same or remote location relative to the freight unit. As shown in FIG. 1, the sensing devices may include a plurality of depth cameras 102A-102E and range sensors. The range sensors may comprise suitable rangefinders such as optical and/or acoustic rangefinders. The optical rangefinder 104 could be a laser diode rangefinder while the acoustic rangefinder could be an ultrasound rangefinder 106. The depth cameras 102A-102E are designed to capture both video and photos of the freight units being measured. Upon determining the measurements and shipping parameters, the system may annotate the photos of the freight units with the measurements and shipping parameters. The client computer device may display this as an annotated visualization on its display and the annotated visualization could indicate a confidence level of the measurements and shipping parameters. Although FIG. 1 depicts only optical rangefinder 104 and one acoustic rangefinder 106, more than one optical rangefinder 104 and more than one acoustic rangefinder 106 could be included as sensing devices. The sensing devices can be mounted on an overhead frame 604, such as shown in FIG. 6. The overhead frame 604 may function as a mounting mechanism for the sensing devices of the measurement system.

The overhead mounting frame 604 is supported by multiple (e.g., 4) vertical support beams 608A-608D. The plurality of overhead support beams may define a space underneath. In this space, one or multiple freight units of a shipment may reside for measurement. If the space is sufficiently large, a carrier vehicle may be positioned within the space if desired as well. Also, the scale could be placed at the bottom portion of the space (ground surface) so that the freight unit(s) resides on top of the scale for measuring when the system is active. The overhead frame 604 may include a central bar 606 on which the central depth camera 102E, optical rangefinder 104 and ultrasound rangefinder 106 are mounted. As such, the sensing devices may be organized in a "pavilion" configuration. The sensing devices may be aligned on the innermost section of the overhead frame 604. Based on this overhead frame 604, each of the devices may be aligned overhead of the ground surface on which the freight unit 602 is placed. For example, the sensing devices may be at a suitable height relative to the ground surface, such as 9-11 feet.

In one embodiment, the sensing devices are all at the same height level. The freight unit 602 to be measured is placed on the ground surface under the central depth camera 102E and within the field of view of the surrounding cameras 102A-D. In this way, each of the depth cameras 102A-102E may be downward facing or pointing cameras and mounted on a support beam 608A-608D such that the freight unit 602 is within the field of view of each camera 102A-102E. The scale could be located in the same location where the freight unit 602 is placed under the overhead camera 102E, or the scale could be located remotely from the frame 604. The freight unit 602 may be weighed before or after the other dimensions and shipping parameters of the freight unit 602 are measured/determined. The overhead frame 604 may be shaped as a cube or any other suitable shape. The various sensing devices should be arranged on the frame 604 so that they do not block each other's view of the freight unit 602.

A freight unit 602 may be loaded on a scale (not shown in FIG. 6) beneath overhead depth cameras 102A-102E, optical rangefinder 104 and ultrasound rangefinder 106 and in the space defined underneath the support beams 608A-608D. As shown in FIG. 1, the depth cameras 102A-102E are mounted in the center and on each side of the overhead frame 604. The five depth cameras 102A-102E are used to measure, photograph, and take videos of the freight units/shipment. The side depth cameras 102A-102D may be positioned at 90 degrees intervals around the freight unit 602. In this way, the center depth camera 102E may be located directly overhead of the scale while the side depth cameras 102A-102D may each be located on a different side of the scale. Also, the side depth cameras 102A-102D may each be an equal distance apart from the center depth camera 102E. The optical rangefinder 104 and ultrasound rangefinder 106 may be mounted on overhead frame 604 adjacent to the central overhead camera 102E to measure the height of the freight unit 602. All measurements from the sensing devices are obtained and used in conjunction to determine a more accurate measurement. The optical rangefinder 104 and ultrasound rangefinder 106 may be used to monitor the status and accuracy of the cameras 102A-102E and the state of the processes. Weight can be obtained from the scale and transmitted via serial communications to the local work station 706 (see FIG. 7) of the dimensionalizer system. The local work station 706 is communicatively coupled to the scale (e.g., via an application programming interface) and may initiate a request to the scale for the weight. The local work station 706 acts as a local communication server between the local devices (e.g., measurement system, client computer device) and the remote systems (e.g., host computer system).

The local work station 706 may comprise two components, including a TCP connection and a listening TCP server. The TCP connection establishes and enables a shared pointer. The TCP connection can be kept alive via shared pointer. Initialization of the communication between local devices (e.g., mobile computer device) and remote systems (e.g., FMS) to a client may be achieved via a port. A socket can be created and used to initiate an asynchronous accept operation to wait for a new connection. Subsequently, a block of data may be sent to the client, which the client receives asynchronously. The TCP server is programmed to keep the TCP connection alive via shared pointer. In addition, the TCP server can initialize an acceptor to listen on a TCP port. Thus, the asynchronous accept operation is initiated, the client request is then serviced, and the system prepares for the next operation. The data may be served to the client via asynchronous operations that provide the arguments in the handler parameter list and prepares the data for the client such as the client computer device.

Figure 7:
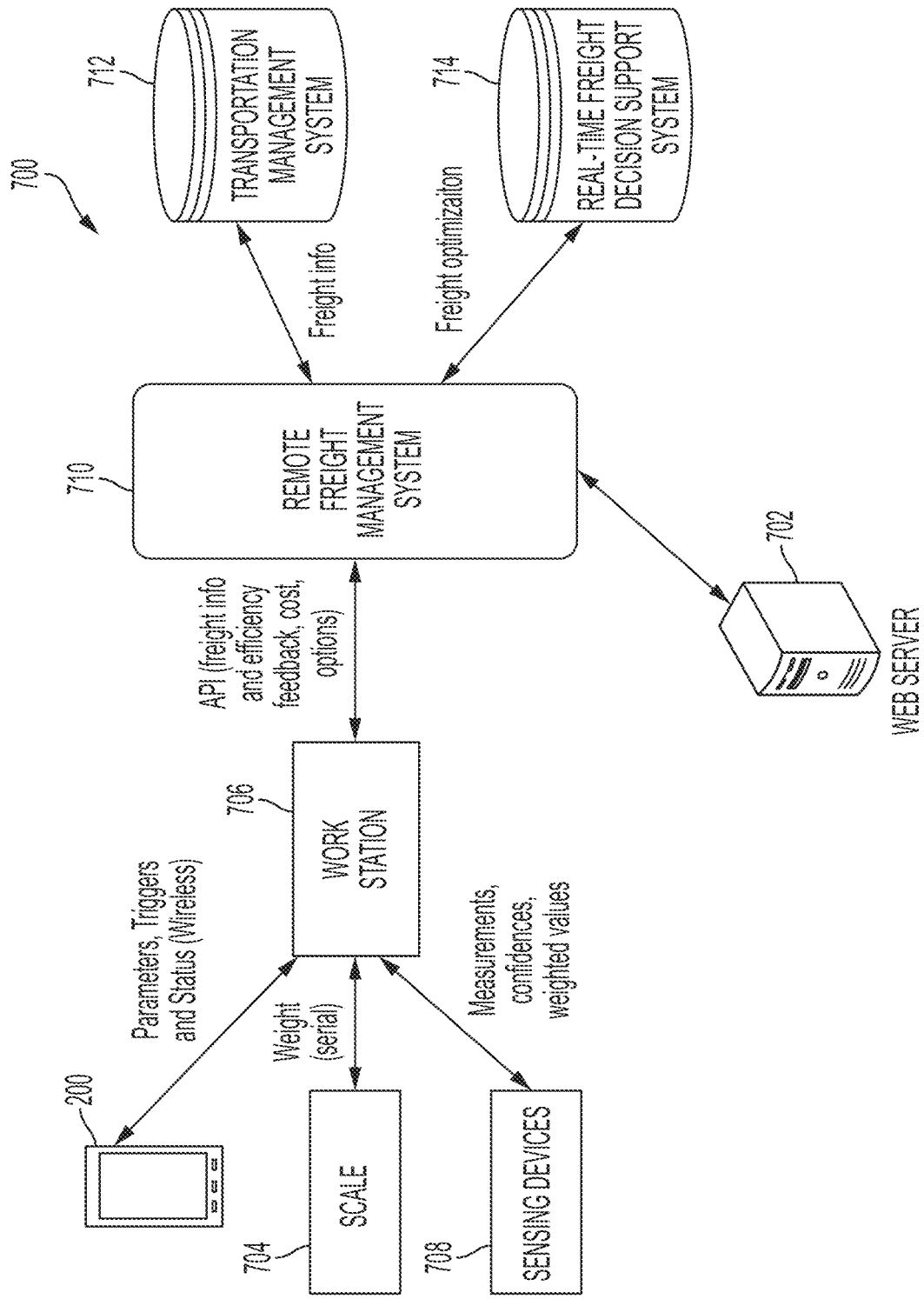
FIG. 7 is a diagram of the dimensionalizer system, according to various embodiments of the present invention.

The dimensionalizer system may comprise numerous major hardware and software components such as: a weighing component, a dimensioning component, applications running on a mobile device (e.g., a tablet and mobile phone), a freight unit image processing component, an Application Programming Interface (API), a registration component, and a database profile component. The weighing component may obtain the weight electronically via serial port from a standard scale 704 (e.g., a National Type Evaluation Program (NTEP) scale), which is shown in FIG. 7. The dimensioning component comprises the multiple sensing devices (e.g., depth cameras and rangefinders), which are used to calculate the dimensions of the freight unit 602, including height, length and width. The dimensioning component could also be referred to as the measurement system. In particular, the measurements obtained from depth cameras 102A-102E may be refined with the range data from the optical rangefinder 104, and further refined with the range data from ultrasound rangefinder 106 to obtain more accurate measurements. When no freight units 602 are located on the scale, a calibration function of the system may be triggered. That is, the scale 704 can be zeroed or normalized so that the weighing component may obtain accurate weight measurements.

The mobile device applications may be used to capture bill of lading (BOL) and freight information from a subject freight unit 602, such as by controlling a code reading component of the corresponding client mobile device. As discussed above, the client computer device is not limited to mobile devices. A subject freight unit 602 may have a QR code, bar code, or some other suitable optical machine readable code storing freight characteristics and other freight information such as freight unit class and identifying information. Accordingly, the mobile device may comprise a QR or bar code reader, etc. to read this information. Also, the mobile device could capture this information via manual entry. The client mobile/computer device may execute an application to capture BOL information using a means such as one of the approaches discussed above. Upon capture of the BOL information, the client computer device may trigger the measurement system to determine the shipping parameters of the shipment, such as by transmitting a signal to activate the sensing devices. The function of the client device is described in more detail below with reference to FIG. 2. The freight unit image processing component is described in more detail below with reference to FIG. 4. The API may be used to create a BOL or update an exiting BOL. Also, the API is usable to transmit the measurements and/or shipping parameters, including length, width, height, and weight, to the remote FMS 710. The API could also transmit the images or other visualizations of the freight unit 602 (e.g., shown in FIG. 4) to the FMS, which may be advantageous for insurance claims. The registration component registers, aligns, and calibrates the output of the sensing devices, as discussed in further detail with reference to FIG. 7.

The database profile component stores client/freight site profiles, which may specify information such as corresponding freight site characteristics, shipping and client preferences, freight metrics, and other information for dynamically determining recommended adjustments by the computer system. Each profile in the database may describe client product inventory and freight metrics. The inventory information and freight metrics are received and analyzed by the FMS when the corresponding bar code (or other identifying data) of the freight unit is scanned (or otherwise input). Freight metrics may include product class, subclasses, and applicable pricing rule information for the goods/products that comprise the freight unit 602. Freight metrics may also include estimates or preferential ranges of shipping parameter values such as density, weight, height, length, width, area, and pounds per cubic foot. The FMS or dimensionalizer system can use the scanned data from the client profiles in the database to make real-time cost savings recommendations on the shipment. In particular, present and historical information can be used to calculate the costs of shipment and lost savings (e.g, opportunity cost) based on the freight class. This prospective recommendation provides real-time recommendation based on the current shipment and previous shipments. The computer system may determine adjustments to shipping parameters to provide a dynamic profile of client options for freight shipment. The dynamically determined adjustments/recommendations can change over time to track the real-time status of the efficiency and costs of the distribution and shipment.

Figure 2:
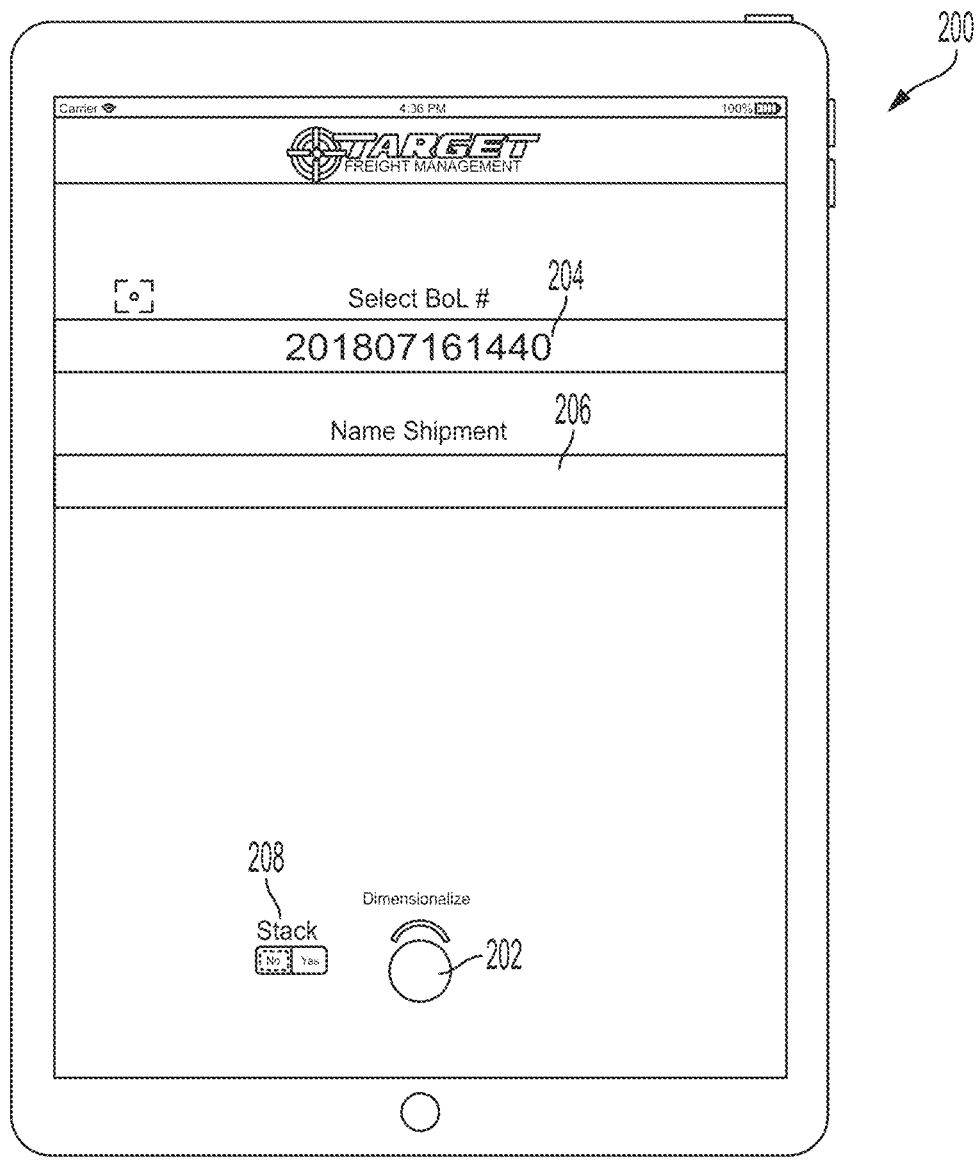
FIG. 2 shows a mobile computing device that may be used in the dimensioning process, according to various embodiments of the present invention.

FIG. 2 shows a mobile computing device 200 that may be used in the dimensioning process, according to various embodiments of the present invention. The mobile computing device 200 may be a mobile phone (e.g., an iPhone or Android device), tablet (e.g., iPad), or some other suitable handheld computing device, including a laptop computer.

The mobile computing device 200 is an example of a client computer device of the system, as discussed above. More than one mobile computer device 200 can be provided when appropriate or desired. The mobile computing device may send a trigger to the sensing devices 708 to start the dimensioning process. The process includes taking photos from the top and four side angles of the freight unit 702 by the depth cameras 102A-102E. Simultaneously, the optical rangefinder 104 and ultrasound rangefinder 106 may take measurements (e.g, of distance) for determining shipping parameters such as length, width and height of the freight unit 602 (see FIG. 6) while, before, or after the weight of the freight unit 602 is measured using the NTEP scale 704. As shown in FIG. 2, the dimensioning process performed by the system may be triggered by a user selecting the dimensionalize icon 202 of a user interface provided by the display of the mobile computing device 200. This interface could be rendered according to a mobile app executed by the mobile computing device 200. The dimensionalize icon 202 can be a graphical user interface (GUI) button.

Selecting the dimensionalize icon 202 may also result in determining and displaying the dimensioning status and completion/error statuses. Statuses could include an indication that the determination of a shipping parameter is complete or that a depth camera 102A is malfunctioning, for example. The mobile computing device 200 can be used to trigger the operation of all sensing devices, interfaces, and communication (internal and external) of the dimensionalizer system. To start the performance of the dimensioning process, the user should input identifying information such as BOL number or the name of a shipment. To this end, the display of the mobile computing device 200 may include a select BOL input field 204 and a shipment name input field 206. The user could type in the relevant BOL number at the select BOL input field 204 and shipment name at the shipment name input field 206. Additionally or alternatively, the user could provide the identifying BOL number and/or shipment name by drop down menu or some other suitable user-interface selection/input means. Alternatively, as discussed above, the system may commence the dimensioning process upon capturing, by the client computer device, BOL information via an optical or other code such as QR code or bar code. Freight unit specific parameters such as BOL or freight name could also be obtained by the code.

Moreover, the mobile computing device 200 could use voice control to verbally receive the user's input information. Each display also can have a stackable toggle button 208 indicating whether the freight unit is stackable. Whether the freight unit is stackable may alter the determination, by the computer system, of the recommended adjustment to the shipping parameters. For example, when a freight unit is nonstackable, this may act as an additional constraint against an otherwise more desirable reconfiguration of the freight units in the shipment carrier vehicle. The mobile computing device 200 communicates to the local work station 706, e.g. wirelessly (e.g., a WiFi network). Furthermore, the work station 706 can be in communication with the sensing devices 708, the scale 704 and/or the FMS 710 via the API. That is, the work station 706 may communicate with the host computer device and client computer device via the API. Other parameters associated with an identifying BOL number or shipment name may be freight specific parameters or how the freight can be transported (e.g., maximum density of freight unit as measured in pounds per cubic feet (PCF), maximum area, whether the freight unit is stackable).

The shipping parameters such as density (e.g. PCF) and area may be calculated based on the received measurements from the sensing devices. The local work station 706, mobile computing device 200, and/or host computer system may determine shipping parameters such as the dimensions and density of the freight unit based on the measurements from the sensing devices. In addition, the local work station 706 could be programmed to combine point cloud threads from the depth cameras 102A-102E in order to determine a composite point cloud for the freight units in a shipment. The composite point cloud can combine the individual point cloud threads based on the measurements from the rangefinders (e.g., rangefinders could be used to calibrate and align the depth cameras 102A-102E so as to determine which point clouds from which depth camera should be used for each particular angle or portion of the 3D model). In this way, the computer system may determine the height, width, and depth of the freight units in the shipment based on the composite point cloud.

Figure 3:
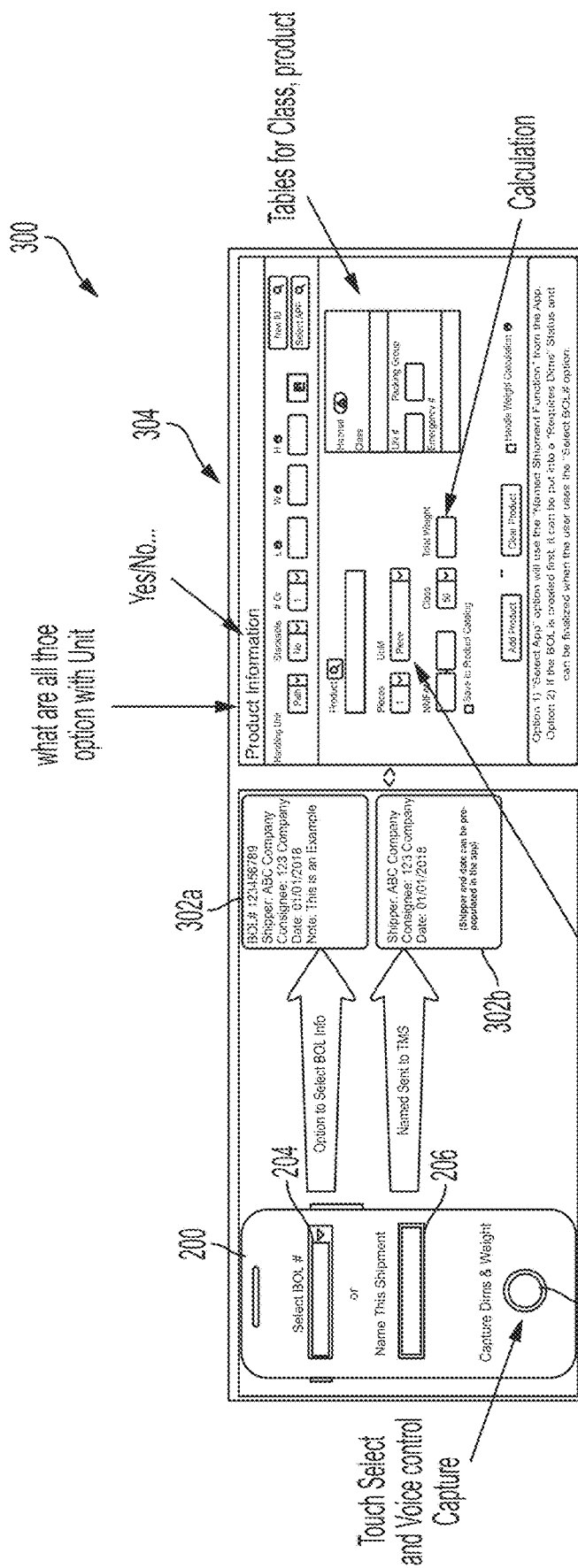
FIG. 3 shows a screenshot of a mobile computing device with a display including a dimensionalize icon, select BOL input field and a shipment name input field; two sample selected BOLs, and a product information screen, according to various embodiments of the present invention.

FIG. 3 shows a screenshot 300 of a mobile computing device 200 with a display including a dimensionalize icon 208, select BOL input field 204 and a shipment name input field 206; two sample selected BOLs 302a, 302b, and a product information screen 304, according to various embodiments of the present invention. The screenshot 300 illustrates shipment name information and freight product information for shipment, which comprises one or more freight units 602. The mobile computing device 200 on the left portion of the screenshot 300 is a similar screen as that described in FIG. 2. In the screenshot 300, the display of the mobile computing device 200 has a drag-and-drop select BOL input field 204 menu GUI icon and a shipment name textual input field 206 GUI icon. Accordingly, the mobile computing device 200 user may choose an associated BOL of a subject shipment based on using either of the GUI icons 204, 206. In this connection, the sample selected BOL 302a has data fields indicating a BOL number is 123456789, shipper is ABC company, consignee is 123 company, and date is Jan. 1, 2018. This selected BOL 302a may when the user drags down the select BOL menu 214 to find the desired BOL number.

Similarly, when the user types in the desired shipment name, the mobile computing device 200 and/or host computer system may retrieve the corresponding shipment information and cause the mobile computing device 200 to display sample selected BOL 302b, which indicates shipper is ABC company, consignee is 123 company, and date is Jan. 1, 2018. The sample selected BOLs 302a, 302b could function as shipping labels for the shipment. Also, instead of the user inputting or selecting such shipment information, the shipment information could be prepopulated into data fields of the app executed by the mobile computing device 200. The user can also touch the dimensionalize icon 208 to cause the system to determine shipping parameters, such as freight unit dimensions and weight. Alternatively, the user can use a voice control functionality of the mobile computing device 200 to start the dimensioning process. The BOLs and shipping labels might be transmitted to and/or stored by host computer system via the API from the mobile computing device 200 when the user is inputting the shipment information. Alternatively, the shipment information could be retrieved from the host computer system via the API. The API may support the interface to the FMS via API RESTful calls to create or update a BOL. The product information screen 304 may be the screen that appears when Product Information 512 banner (shown in FIG. 5) is expanded. In the product information screen 304, the user may input initial shipping parameter and other freight/product information such as stackable nature, dimensions, product type, class, etc.

Figure 4:
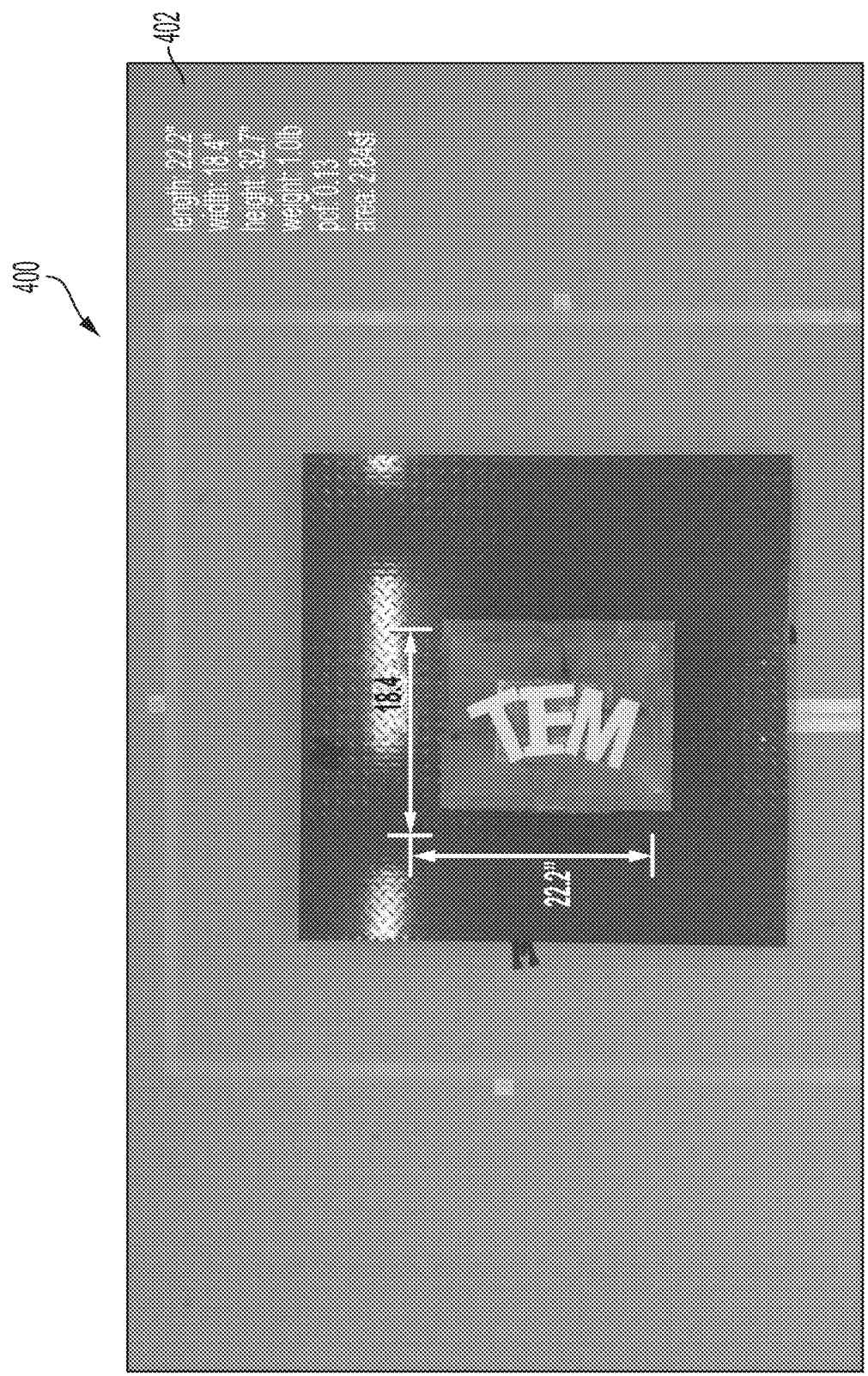
FIG. 4 shows a visualization of a freight unit generated by the freight unit image processing component according to various embodiments of the present invention.

FIG. 4 shows a visualization 400 of a freight unit 602 generated by the freight unit image processing component according to various embodiments of the present invention. The visualization 400 may be generated by the work station 706 based on the images of the freight unit 602 captured by the depth cameras 102A-102E. In the example of FIG. 4, the visualization 400 is the image of the freight unit 602 captured by the overhead depth camera 102E. This visualization can be annotated to show determined shipping parameters such as the length and width of the freight unit 602, as shown in FIG. 4. Annotated freight parameters also include height, weight, PCF and area of the freight unit 602. Also, the annotated visualization could indicate a confidence level (not shown) of the determined shipping parameters. The visualization 400 may be transmitted by the work station 706 to, and displayed on, the mobile computing device 200 to graphically illustrate the freight unit 602 being measured. When the visualization 400 is annotated, details of various shipping parameters are depicted. The measured length, width, height, and weight can be used to calculate the density as measured in PCF and area of the freight unit 602. As shown in FIG. 4, the freight unit/shipping parameters may be displayed on the top right corner 402 of the visualization 400. The shipping parameter measurements, photos, and video of the freight unit 602 are captured by the sensing devices and transmitted. The captured data can be transmitted to the mobile computing device and be stored, such as in the database profile component. The stored video could be used to optimize workflow efficiency recommendations. The photos of the freight unit 302 may also be used for insurance claims as supporting documentation of the condition of the freight unit 602 before shipping.

Moreover, the visualization 400 may show the weighted value and confidence value of the measurements by the sensing devices. As discussed above, the photos are captured from the depth cameras 102A-102E. The dimensionalizer system may be programmed to capture one video file of the freight unit and five photos (from top central camera 102E and from each of the four sides corresponding to depth cameras 102A-102D). That is, the depth cameras 102A-102E may be programmed to capture both video and photos and to apply measurements to the photos, such as for annotation. One of the images, such as the overhead camera image, or an aggregation of several images, may be obtained and annotated with the measured freight dimensions and/or shipping parameters, as shown in FIG. 4. This information can be critical for processing insurance claims. Thus, the freight unit image processing component supports the visual display of the visualization 400 on the display of the mobile computing device 200.

Figure 5:
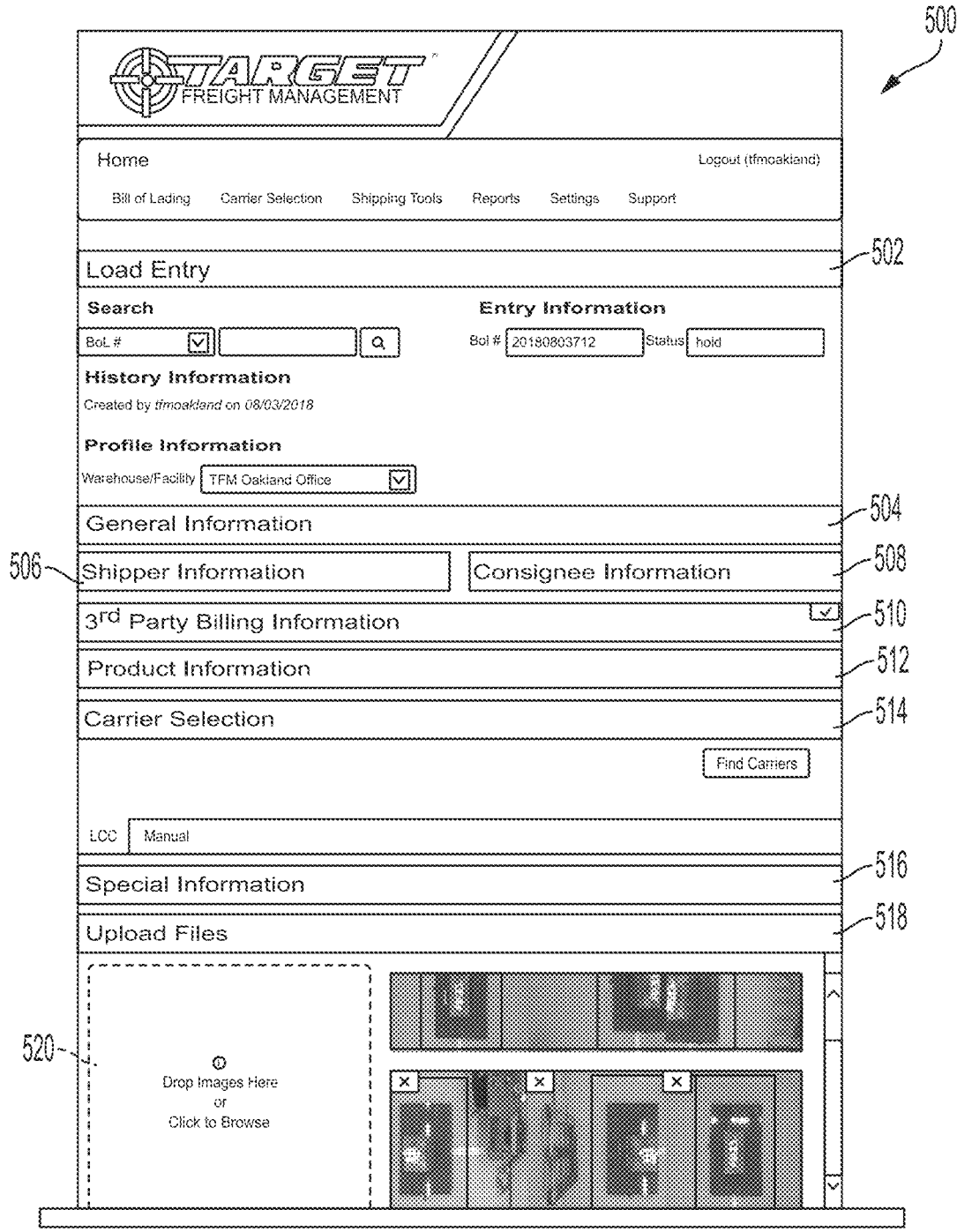
FIG. 5 illustrates a graphical user interface (GUI) for creating or updating a BOL, according to various embodiments of the present invention.

FIG. 5 illustrates the GUI 500 for creating or updating a BOL, according to various embodiments of the present invention. The BOL GUI 500 may be displayed by the mobile computing device 200 and the data captured by it transmitted to the work station 706, which communicates with the remote FMS 710 and/or mobile computing device 200 via the API (e.g., API RESTful calls) to create or update a BOL. Communication to the API can be established via an API key, with authentication. This call passes a video, images, and the parameters associated with the freight/BOL to the Transportation Management System (TMS) 712 shown in FIG. 6. In various embodiments, the GUI 500 can be a web page served by a web server 702 to a customer or client such as on the mobile computing device 200 display, so that the client user can input parameter values for shipping a freight unit 602, view shipping rates for various shipping carriers as computed by the FMS, select a desired carrier based on displayed rates, and perform other desired functions relevant to shipping the shipment. The web server 702 may be in communication with the remote FMS 710. The web page could be displayed by the mobile computing device 200 or any other suitable mobile, desktop, or other client computer device that can access the web server 702 via the Internet or other suitable network. As shown in FIG. 5, the BOL entry screen has multiple banners including Load Entry 502, General Information 504, Shipper Information 506, Consignee information 508, 3rd Party Billing Information 510, Product Information 512, Carrier Selection 514, Special Information 516, and Upload Files 518.

The banners may be collapsible and expandable according to the user's preferences. Under the Load Entry 502 banner, history information, BOL identification number and the status of the loaded BOL may be displayed in a text field. Additionally or alternatively, this information may be selectable via a GUI user input means such as a text box, drop down menu, or other GUI icon for the user to input the corresponding data. The other banners General Information 504, Shipper Information 506, Consignee information 508, 3rd Party Billing Information 510, and Product Information 512 are expandable but shown as collapsed in FIG. 5. Carrier Selection 514 includes a least cost carrier (LCC) option and a manual option. Files such as the videos or photos described with reference to the visualization 400 in FIG. 4 could be uploaded via drag and drop, for example, in the image upload component 520 under the Upload Files 518 banner. Different orientations of the visualization 400 are selectable and other suitable videos and photos can also be uploaded. The BOL GUI 500 may be rendered on the display of the mobile computing device 200. More details regarding the BOL GUI 500 can be found in U.S. Pat. No. 9,747,578, issued Aug. 29, 2017 (hereinafter, "the '578 Patent"), which is hereby incorporated by reference in its entirety.

FIG. 6 is a schematic 600 that shows the sensing devices mounted on an overhead mounting frame 604, according to various embodiments of the present invention. As discussed above, the overhead depth cameras 102A-102E, the optical rangefinder 104 and the acoustic rangefinder 106 (e.g., ultrasound rangefinder 106) may be aligned about the overhead frame 604. That is, all of the sensing device may be at the same height level. Additionally, the rangefinders and overhead downward-point central camera 102E may all be mounted on the central bar 606. Specifically, the rangefinders may be adjacent to the central camera 102E such as the optical rangefinder 104 on one side of the central camera 102E and the acoustic rangefinder 106 on the other side of the central camera 102E, as shown in FIG. 6. The overhead depth cameras 102A-102E, capture photos and/or videos of a subject freight unit 602 placed under and within the field of view of the cameras. Each of the overhead depth cameras 102A-102E may function by using point cloud library (PCL) threads (e.g., Intel® RealSense™) such that each depth camera 102A-102E generates a point cloud thread, for a total of five threads across the five cameras 102A-102E. The five threads may be joined together by threaded pipeline of the work station 706.

To obtain the PCL threads, point clouds may be obtained from each depth camera 102A-102E. The points of the point clouds are converted to PCL to obtain the width, height, position of the vertices, and the texture coordinates. The threaded pipeline is used for multithreading each PCL thread. The overhead depth cameras 102A-102E and/or the work station 706 may then perform post filtering, point cloud transformation, and PCL point cloud filtering on the images collected by the cameras 102A-102E. Based on this processing, the overhead depth cameras 102A-102E and/or work station 706 can generate a transformed, filtered point cloud. The transformed point cloud may be a composite point cloud generated based on determining which points of the individual point clouds should be included in the composite, for example. This process may be facilitated by using the range data from the rangefinders to calibrate the cameras and determine which camera should be the source of which portions of the composite point cloud. The stream depth of the color and depth can be aligned via autoexposure.

The post processing may be initialized to reduce the depth frame density, perform edge-preserving spatial smoothing, reduce temporal noise and perform depth to disparity transformation to improve spatial and temporal filtering. The color frame may be aligned to depth frame. Also, the color frame can be mapped to the relevant point cloud. In general, filtering includes removing unwanted objects in the view of the sensors. At the end of this processing, a video and multiple photos may be generated and saved for end of processing API transmission. The point cloud transformation may be processed to the center depth camera 102E. In particular, steps may include: the point cloud is stored into a grid to down-sample based on the leaf size, points are cropped within a box, rotation and translation is performed based on depth quality, and the red green blue (RGB) color frame format is transformed to hue saturation value (HSV) format. The points can be filtered according to the color information for a known predetermined exclusion filtering threshold. Subsequently, statistical outliers may be determined by calculating the average distance of each point from other points (MeanK). In this way, points outside the standard deviation threshold are removed.

The image from the center camera 102E can be used to project 3D points to 2D by removing depth information and normal projection and by using camera intrinsics projected from the central camera 102E. The obtained weight for the freight unit 602 from the scale 704 can be applied to the 2D image. The work station 706 may combine the point clouds from all five cameras 102A-102E to generate a composite point cloud for the freight unit 602, from which the dimensions and other shipping parameters of the freight unit 602 are determined. In this way, the initial length, width, height information for the freight units 602 from the center camera can be obtained. Subsequently, the dimensionalizer system may confirm all information from edge cameras 102A-102D to validate and correct center measurements. The edge camera data can be used to confirm the central camera 102E measurements. Then, the information from the optical and ultrasound rangefinders 104, 106 can be applied, respectively, for further validation.

The downward facing overhead depth cameras 102A-102E may determine the maximum number of similar iterations to control the processing multiple times. Transformation validation may be used to check the percentage of overlapping surfaces of multiple point clouds. The coordinates of the number of overlapping regions may be assessed to determine if the surfaces of the point cloud are consistent. Coarse alignment may be performed via descriptor matching. That is, using 3D keypoints, aligned points may be extracted from multiple clouds by matching associated descriptors. The three dimensional (3D) image can be analyzed to find the corners of the freight unit 602 in the images. Specifically, correspondence rejector surface normals are used to reject points where normals exceed a predetermined threshold. Furthermore, points are also rejected if they are erroneous points that seem similar such that they are duplicative, for example, or if they seem to be points beyond boundary points. Correspondences can be based on points on the surface boundaries. Termination criteria (when iterations stop using default convergence criteria) can be defined as one or more of the following: a maximum number of iterations set, an absolute transformation threshold, and termination when current estimated transformation exceeds all set thresholds. Keypoint descriptors may include: spin image descriptor, best point feature histogram descriptor, shape context 3D descriptor, unique shape context, shot estimation, ransac (random sample consensus) algorithm used to filter outliers for bad descriptor correspondences.

Based on the point clouds and the processing described above, the height, other dimensions and/or other shipping parameters of the freight unit 602 may be initially determined by the overhead depth cameras 102A-102E. The processing described above may be used to achieve a coarse alignment and calibration of the multiple depth cameras 102A-102E. As described in further detail below, the optical rangefinder 104 (which may measure height of the freight unit but not at the resolution of the depth cameras 102A-102E) may be used for more precise alignment, calibration, and registration of the depth cameras 102A-102E. That is, the optical rangefinder 104 may double check the height determined by the depth cameras 102A-102E via LIDAR (Light Detection and Ranging) with pulsed LED and/or laser light. The ultrasound rangefinder 106 may be used for a similar function as the optical rangefinder 104, but perform the function based on sonar. An automatic registration, alignment, and calibration of the cameras 102A-102E, the optical rangefinder 104, and ultrasound rangefinder 106 may occur at startup of the dimensionalizer system. This may be performed by the registration component. Alignment of the depth cameras 102A-102E, optical rangefinder 104, and ultrasound rangefinder 106 advantageously may improve the accuracy of the corresponding measurements. Furthermore, the computer system may receive a signal from the mobile computer device 200 to trigger measurement by the sensing devices of the measurement system.

The registration component may be used to recognize and test the alignment of all components. The registration component also can assign the area of most confidence and weighted values for confidence when applying the measurements. This determines the scope of view for each component. In this way, the sensing devices are automatically aligned to accurately measure the freight. The registration process by the registration component can also be used to reduce error margins. For example, in a panoramic view, the overlap between individual overhead depth cameras 102A-102E should be hidden. The specific sides and angles measured by the depth cameras 102A-102E can be considered in conjunction so that the registration component determines which camera is the correct or appropriate camera for a particular side or angle. The LIDAR and sonar range data outputs from the optical rangefinder 104 and ultrasound rangefinder 106, respectively, may be used in this determination.

The optical rangefinder 104, as shown in FIG. 6, may use LIDAR to measure distances and other dimensions of the subject freight unit 602. Preferably, between one to four optical rangefinder 104 are provided, but other numbers of optical rangefinder 104 are also possible. The optical rangefinder 104 can obtain numerous range data/measurements. The range data of the optical rangefinder 104 can be used to confirm and refine the results provided from the depth cameras 102A-102E. Also, the optical rangefinder 104 can determine the 3D spatial volume of the subject freight unit 602 and assign a confidence level to the information obtained or determined. Furthermore, the ultrasound rangefinder 106, as shown in FIG. 7, may use sonar to measure distances and other dimensions of the subject freight unit 602. Preferably, between one to four ultrasound rangefinders 106 are provided, but other numbers of ultrasound rangefinders 106 are also possible. These measurements/range data of the ultrasound rangefinders 106 are used to confirm and refine the results provided by the depth cameras 102A-102E and optical rangefinder 104. The ultrasound rangefinders 106 can determine the spatial volume of the freight unit 602 and assign a confidence level to the information obtained. As discussed above, confidence levels or values can be used in the annotated visualization 400. The volume and measurement data and the confidence level can be used in conjunction to obtain more accurate measurements of the freight unit 602.

The dimensionalizer system can be self-monitoring. For example, if there is a defect or deficiency with an optical rangefinder 104, the dimensionalizer system may self diagnose this issue. Accordingly, the dimensionalizer system may activate or insert standby/backup equipment and/or identify what component of the malfunctioning optical rangefinder 104 needs to be replaced. In this way, the dimensionalizer system advantageously is programmed to address such issues without manual intervention. Moreover, the dimensionalizer system may monitor the status of all local devices and perform system checks when the system is in an idle mode. The remote monitoring of the dimensionalizer system also can include triggering a calibration function. The ultrasound rangefinder 106 may be used to detect when nothing is on the scale 704 so that the calibration function can be triggered. For example, when the ultrasound device 106 detects nothing is positioned on the scale 704, the calibration function can be triggered to verify whether the depth cameras 102A-102E are aligned properly (e.g., if the camera angle has changed). The periodicity of this calibration verification can be some appropriate interval such as every five minutes, every half hour, or some other suitable time period. The self-monitoring dimensionalizer system can also constantly check whether communications between various components of the system are still operating properly.

The real-time freight decision support system database may perform self-checks during idle time when nothing is on the scale 704. The self-checks can be performed according to periodic intervals as described above. The ultrasound rangefinder 106 is able to determine when nothing is present on the scale 704 as well as receive confirmation from the scale 704 before processing that the weight is at zero. For example, the self-checks can be camera distance checks. Specifically, the system may verify that the distance from the floor and camera angles have not changed in relation to prior checks and/or the initial setup check. The self-checks can also include verifying that communications between various components of the system is operational and that the sensing devices are mounted at the appropriate location. Also, the self-checks can include automatic calibration.

FIG. 7 is a diagram of the dimensionalizer system 700 according to various embodiments of the present invention. As shown in FIG. 7, the mobile computing device 200 and the scale 704 (weighing component) are both communicatively coupled to the local work station 706. The local work station 706 may execute software for communicating and transmitting information to a remote component of the system such as remote freight management system (FMS) 710. In this way, the local work station 706 is a local hub for the dimensionalizer system. Communication between the local work station 706 and remote FMS 710 occurs via an API coordinated by the local work station 706. The local work station 706 may receive all outputs from the sensing devices and calculate measurements based on the outputs while considering confidence levels and weighted values. The local work station 706 may transmit a variety of outbound information, which may include: (1) parameters, triggers, and status from the mobile computing device 200; (2) weight from the scale 704; and (3) measurements, confidence level, and weighed value from the sensing devices 708. Also, the local work station 706 can provide live feedback and shipment optimization recommendations from the remote FMS. As discussed above, the sensing devices 708 comprise overhead depth cameras 102A-102E, optical rangefinder 104 and ultrasound rangefinder 106. The remote FMS 710 may obtain freight information from the transportation management system (TMS) database 712, which may enable the FMS 710 to store and track the freight.

The real-time freight decision support system 714 supports the remote FMS 710 in making real-time recommendations on the optimization of shipments based on freight type and standard inventory. The recommendations may be based on local optimization or global optimization. Local optimization refers to optimization of a particular freight unit or shipping container while global optimization refers to optimization of a shipper's total or aggregate product to be shipped. In global optimization, the total number of freight units in a shipment may be considered to lower the cost of shipping the shipment. For example, the computer system may recommend changing the number of freight units in a shipment while considering the remaining number of freight units to be shipped in other shipments so that total cost of shipment may be reduced. Accordingly, the computer system could recommend moving some number of freight units from one shipment in a first carrier vehicle to another shipment in a second carrier vehicle so that the combined or total cost of shipping is reduced. More specifically, the computer system might recommend changing the content of particular freight units so that more of the freight units in a particular shipment become density-based or product-class based or so that a particular carrier vehicle or entire total shipment receive treatment under a certain carrier classification for calculating shipping costs. Whether a freight unit or shipment should be adjusted to become density-based or product-class based may depend on the associated treatment under the applicable carrier pricing rules and whether this treatment would result in reduced shipping costs. In this connection, the computer system may consider that various types of density classes are cheaper than other different density classes and similarly, various types of product classes are cheaper than other different product classes. The recommended adjustments may be provided in real-time to the mobile computing device 200.

The mobile computing device 200 formats the API response by passing all parameters associated with a new or existing BOL, which may be input by the user as described above. The parameters may include an indicator for stackable or unstackable freight (impacts the PCF), PRO number, PO number, BOL number, any reference number or user defined name to freight, status, warehouse, direction (e.g., outbound/prepaid), custom dates, units, products, pieces, type (e.g, Pallet), class, length, width, height, weight, group, nmfc, sub_nmfc, hasmat indicator, un_num. The mobile computing device 200 may accept the BOL from manual data entry or via scanning of a bar code or QR code. The FMS 710, TMS 712 and/or real-time freight decision support system 714 can be part of the computer system, such as part of the host computer system. Communication to the API is established via an API key, with authentication. This call passes a video, images, and the parameters associated with the freight/BOL to the TMS 712. Real-time feedback/recommendations for shipping optimization can be sent back to the local system from the Freight Decision Support System 714. Results may be stored in the remote freight management system 710 for prospective and retrospective analysis and reporting.

Figure 8:
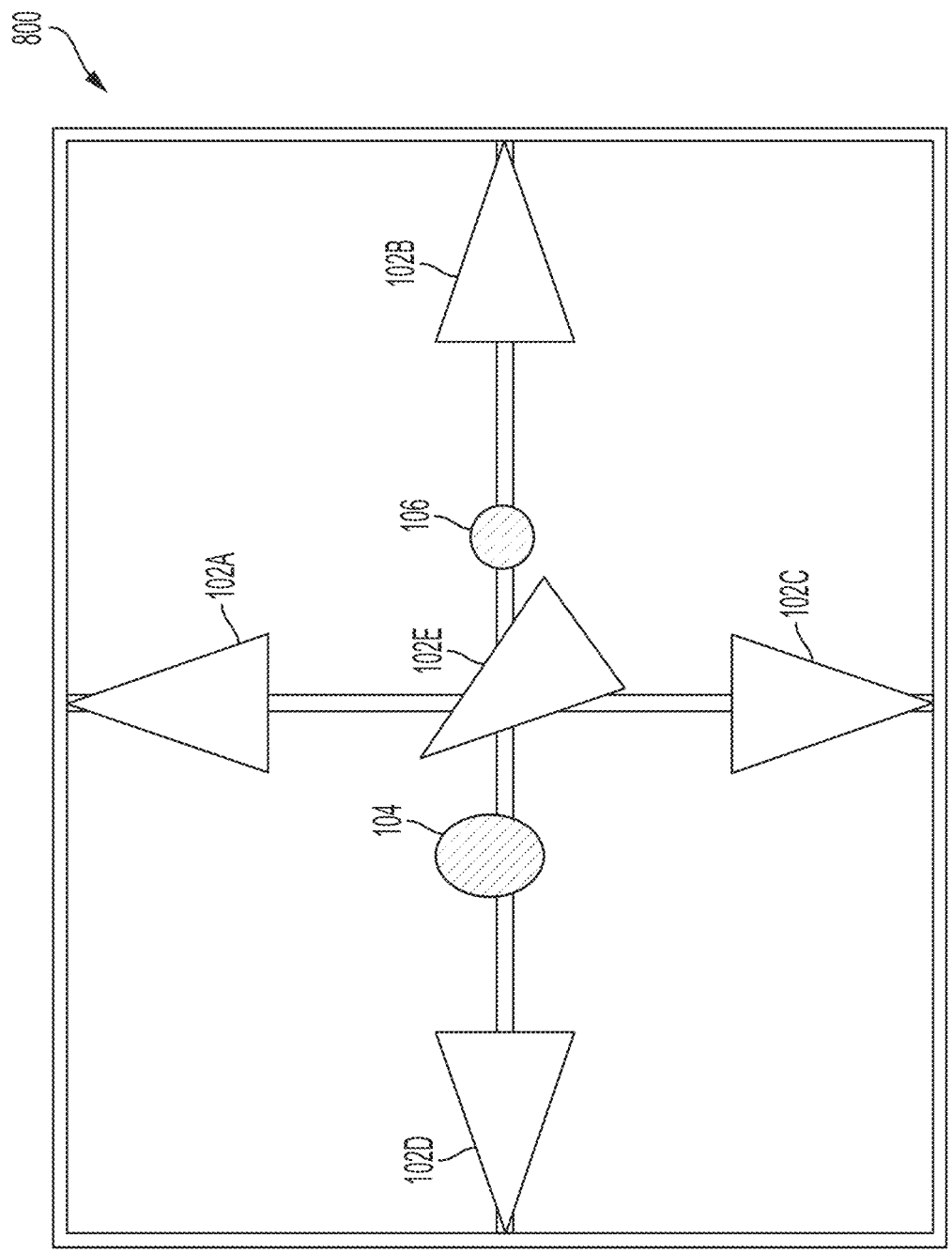
FIG. 8 shows a simplified view of the sensing devices, according to various embodiments of the present invention.

As described above, the weight of the freight unit can be obtained from the scale 704. The local work station 706 communicates with the scale 704 to obtain information via serial communications. The serial communication parameters can be initially set before the local work station 706 connects to the scale 704. A trigger may be sent to the scale 704 to obtain all information from the scale 704 so that weight is parsed from the response. A device container of the system may handle the camera registration and rangefinder pipelines to control enablement of the cameras. Pipelines can be established for each device operation to support multithreading processes. Thus, measurements are obtained from all sensing devices. Based on confidence level and weighted values, the measurements are applied to achieve more accurate measurements of all sides and angles. The merging of measurements consists of all multithreaded processed measurements. Measurements may be cached until all measurements are available. In general, measurements are obtained from depth cameras 102A-102E. Optical range data are applied to the results, and then ultrasound range data are applied for a final refinement of the measurements. Thus, all measurement and range data in conjunction with associated confidence level may be used to obtain accurate shipping parameters of the shipment. FIG. 8 shows a simplified view 800 of the sensing devices, according to various embodiments of the present invention. As can be seen in FIG. 8, the central camera 102E is mounted adjacent to the rangefinders, including optical rangefinder 104 and acoustic rangefinder 106. The central camera 102E could be downward facing and overhead relative to the freight unit 602 and scale 704 underneath the freight unit 602. The side cameras 102A-102D may be on a different side of the scale 704 and/or freight unit 602.

A setting component can be predefined to obtain environmentally specific configurations via a configuration file. This information may include camera names converted to placement (e.g., cardinal orientations such as Center, North, South, East, West), optical rangefinder device name(s), ultrasound rangefinder name(s), authentication parameters, interface API parameters, camera, optical and ultrasound rangefinder height (which can be used to confirm measurements accuracy and check for alignment), minimum and maximum constraints, and system thresholds. Tolerance, and then thresholds can be used to determine what information is needed with each camera. That is, tolerance thresholds are employable by the system to determine which individual point cloud thread from the individual depth cameras 102A-102E should be used in the determination of the shipping parameters. For each dimension: (1) if the change is within a specific threshold, that transformation variance is ignored; or (2) if it is greater than the threshold, it is accepted and applied. The bounding box may then be updated with the additional information. The bounding box can be used to find length and width information. Orientation may be aligned in order to determine which side is length and width, respectively. All variances may be weighted and applied accordingly.

Figure 9:
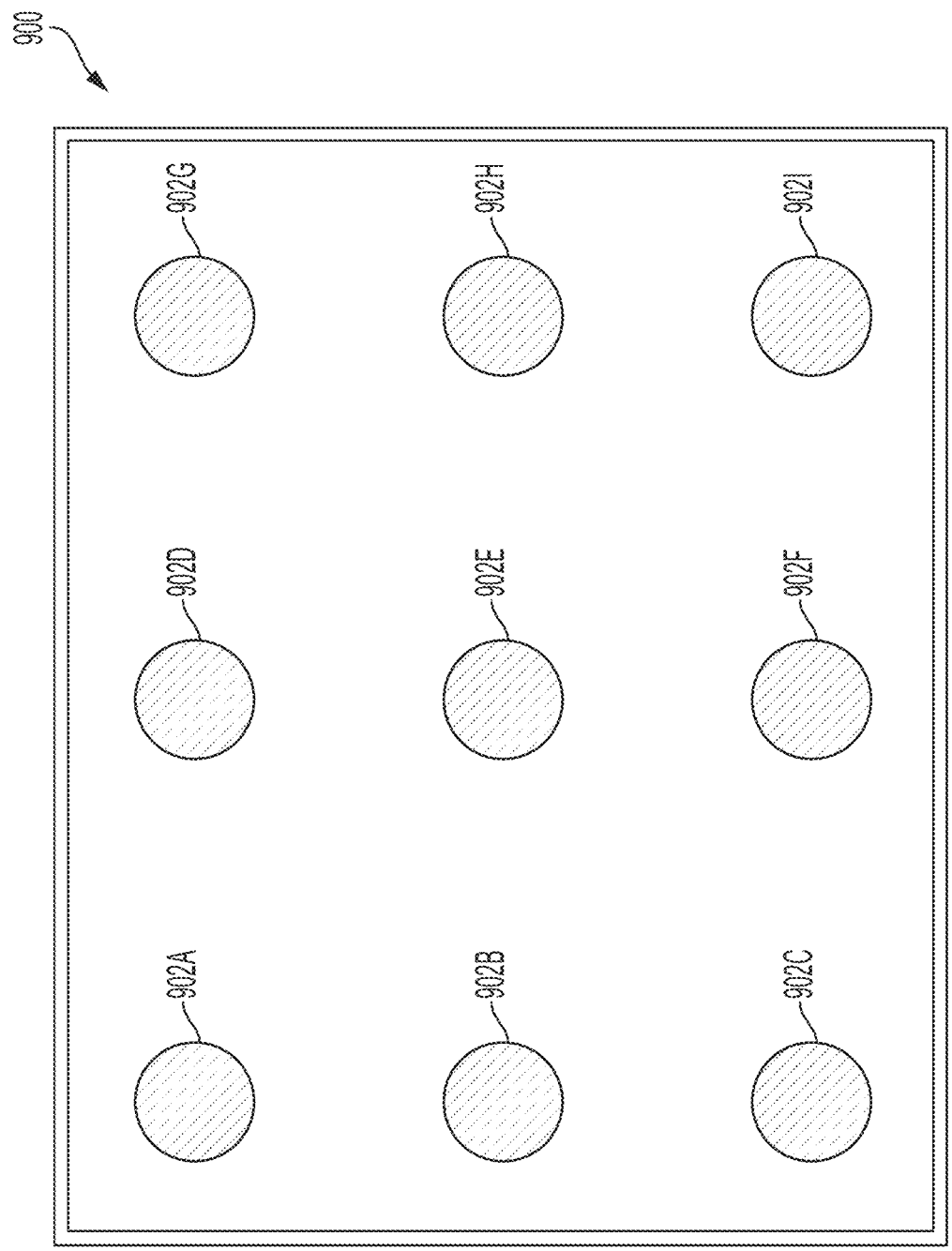
FIG. 9 shows a diagram of a plurality of optical sources for use in camera alignment/registration, according to various embodiments of the present invention.

Registration with the cameras may be achieved as multiple images are captured from each camera 102A-102E with a designated calibration and alignment and light projected from the base below the cameras 102A-102E. To this end, optical sources can be placed underneath the cameras 102A-102E, around the location of the scale 704 (if provided). FIG. 9 shows a diagram 900 of a plurality of optical sources 902A-902I (e.g., laser, LED, laser diode or other suitable optical source) for use in camera alignment/registration, according to various embodiments of the present invention. The optical sources 902A-902I may be located on the ground around the scale 704 (assuming that the scale 704 is at the center of the sensor structure 600 so that the freight unit 602 is weighed at the same time that its dimensions are captured) such that the output from the optical sources 902A-902I is projected upwards from the ground below the depth cameras 102A-102E. In the registration process, filters can be applied for multiple purposes including: transformation; reducing the depth frame density, applying edge-preserving spatial smoothing, reducing temporal noise, applying disparity transformation, applying camera cloud rotation as required, and computing cloud resolution. Also, a fast bilateral filter could be applied. In this way, calibration and alignment of the depth cameras 102A-102E by the dimensionalizer system can be attained using the optical sources 902A-902I.

The registration process can also utilize targets placed in the view of all cameras 102A-102E. The registration application may return a transform for each of the cameras 102A-102D relative to the center 102E. The local work station 706 can directly initiate the registration to a local device such as the mobile computing device 200, although other suitable devices are also possibly used. Alternatively, a VNC (virtual network computing) application is employable. The system can automatically trigger the registration upon startup (as a selectable option) or on demand by the client.

In one embodiment, a recommendation engine of the (computer) system may employ a rate calculator such as described in the aforementioned and incorporated '578 Patent. In particular, the dimensions and weight of the freight unit(s) in a shipment, as determined by the dimensionalizer system described herein, may be input to the rate calculator of the computer system. Also, the goods in the shipment, along with the origination and destination locations for the shipment, all of which may be known from the QR code or other identifying indicia for the freight unit(s), are also input to the rate calculator computer system. Using this data, the rate calculator can calculate the rate for shipping the freight unit(s) with various carriers, using the carrier-specific shipping rules for the various carriers, as described in the '578 Patent. The recommendation engine can then make recommendations on how to adjust the shipping parameters of the freight unit and/or shipment in view of the determinations of the rate calculator. For example, if the rate calculator determines that the freight unit is priced based on density (as opposed to product), and the freight unit is close to being in a cheaper, high-density class, the recommendation engine can recommend that density of the freight unit be changed to move it into the cheaper, high-density class. For example, the recommendation engine may suggest that adding x pounds, without adding more than y cubic inches to the volume of the freight unit, will save z dollars in shipping costs for the freight unit. The shipper may then add a material to the freight unit that meets (or exceeds) the suggestions. For example, the shipper could add a dense, preferably cheap material, such as sand, to the freight unit to positively affect the overall density of the freight unit (e.g., increase the density) so that the freight unit gets classified to a less expensive shipping class.

For a shipment that has multiple freight units, the recommendation engine could also make recommendations on how to adjust the freight units to positively affect (decrease) the shipping costs. For example, if some of the freight units in the shipment are density-based and some are product class-based, the recommendation engine could make recommendations on how to change the goods in the freight units to make more of them density-based or more of them product-class based, depending on which is less expensive given the carrier's rules. Also, for freight units that are density-based, the recommendation engine could make recommendations on how to distribute the goods across the freight units so that more of the freight units are moved into less expensive density classes. Still further, the recommendation engine can recommend changing (e.g., reducing, adding) the number of freight units to advantageously affect (i.e., reduce) the shipping costs. In this way, the dynamic profile of each client can indicate the relative efficiency and costs of various configurations of freight units in real-time, e.g., at the time of shipping. Feedback generated based on this dynamic profile may be transmitted and stored by the dimensionalizer system. The recommendations may be provided to the mobile computing device 200 or to another Internet-connected computer connected to the web server 702.

In various implementations, the present invention is directed to a system comprising: a measurement system for determining shipping parameters of a shipment and a computer system that is in communication with the measurement system. The shipment comprises one or more freight units; each of the one or more freight units comprises one or more goods; the shipping parameters comprise a weight, height, width, and depth for each of the one or more freight units; and the measurement system comprises a depth camera, a scale, and a rangefinder. Range data from the rangefinder are used to calibrate the depth camera. The computer system comprises a client computer device; and a host computer system that is in communication with the client computer device. The computer system is configured to: compute a density for each of the one or more freight units in the shipment based on the shipping parameters; compute a shipping cost for shipping the shipment with a freight carrier based on carrier-specific pricing rules for the freight carrier, wherein computing the shipping cost for the freight carrier comprises determining, based on the carrier-specific pricing rules for the freight carrier, whether the freight carrier would designate the shipment as density-based or class-based for purposes of determining the shipping cost; determine, by the host computer system, an adjustment to the shipping parameters for the shipment that reduces the shipping cost by changing the density of the one or more freight units, wherein the adjustment comprises an increase in weight, height, width and/or depth of the one or more freight units; and transmit, by the host computer system to the client computer device, data about the adjustment prior to loading the shipment onto a carrier vehicle.

The one or more goods may be positioned on a pallet. The adjustment to the shipping parameters for the shipment that reduces the shipping cost may comprise increasing the density of the one or more freight units. The measurement system may further comprise an overhead mounting frame that comprises a plurality of overhead beams; the scale can be located under the plurality of overhead beams; and the depth camera of the measurement system can comprise four or more downward-pointing depth cameras, wherein each of the four or more downward-pointing depth cameras is mounted on one of the plurality of overhead beams, such that when the one or more freight units is on the scale, the one or more freight units is within a field of view of each of the four or more downward-pointing depth cameras. The four or more downward-pointing depth cameras may comprise an overhead downward-pointing depth camera and four side downward-pointing depth cameras; the overhead downward-pointing depth camera can be located directly overhead the scale such that overhead downward-pointing depth camera is directly overhead the one or more freight units when the one or more freight units are on the scale; and each of the four side downward-pointing depth cameras can each located on a different side of the scale.

The overhead downward-pointing depth camera and the four side downward-pointing depth cameras may be at a same height level. The client computer device may execute an application to capture bill of lading information of the shipment to trigger the measurement system to determine the shipping parameters of the shipment. The client computer device may comprise a display to display an annotated visualization of the one or more freight units, wherein the annotated visualization is captured by the depth camera, and wherein the annotated visualization indicates a confidence level of the determined shipping parameters. The rangefinder may comprise a plurality of rangefinders, and each of the plurality of rangefinders may be a rangefinder selected from the group consisting of an optical rangefinder and an acoustic rangefinder. The plurality of rangefinders may be mounted on one of the plurality of overhead beams overhead mounting frame, such that each of the plurality of rangefinders is adjacent to the overhead downward-pointing camera. The system may comprise a work station located at a site of the overhead mounting frame, wherein the work station communicates with the host computer device and the client computer device via an application programming interface (API). The workstation may combine point cloud threads from the four or more downward-pointing depth cameras to determine a composite point cloud for the one or more freight units; and the computer system can determine the height, width, and depth based on the composite point cloud.

In other implementations, the present invention is directed to a method comprising: determining, with a measurement system, shipping parameters for a shipment that comprises one or more freight unit; computing, by a computer system that comprises a host computer system and a client computer device, a density for each of the one or more freight units in the shipment based on the shipping parameters; computing, by the computer system, a shipping cost for shipping the shipment with a freight carrier based on carrier-specific pricing rules for the freight carrier; determining, by the computer system, an adjustment to the shipping parameters for the shipment that reduces the shipping cost by changing the density of the one or more freight units; and transmitting, by the computer system to the client computer device, data about the adjustment prior to loading the shipment onto a carrier vehicle. Each of the one or more freight units comprises one or more goods; the shipping parameters comprise a weight, height, width, and depth for each of the one or more freight units; and the measurement system comprises a depth camera, a scale, and a rangefinder. Range data from the rangefinder are used to calibrate the depth camera. Computing the shipping cost for the freight carrier comprises determining, based on the carrier-specific pricing rules for the freight carrier, whether the freight carrier would designate the shipment as density-based or class-based for purposes of determining the shipping cost. The determined adjustment comprises an increase in weight, height, width and/or depth of the one or more freight units.

A system may comprise the measurement system and computer system and may further comprise a light source to project light towards the depth camera to calibrate and align the depth camera. The depth camera may comprise five depth cameras that each generates a point cloud thread. The host computer system may use a tolerance threshold to determine the point cloud thread used for determining the shipping parameters. A signal may be received, by the computer system, from the client computer device, to trigger measurement by the measurement system. The one or more goods may be positioned on a pallet. Changing the density of the one or more freight units by the host computer system may comprise increasing the density of the one or more freight units. The host computer system may receive a freight metric based on a database profile corresponding to the shipment. The host computer system may change the density of the one or more freight units, based on the received freight metric.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

In summary, numerous benefits have been described which result from employing the inventions described herein. The foregoing description of the embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:
1. A system comprising:
a measurement system for determining shipping parameters of a shipment, wherein:
the shipment comprises one or more freight units;
each of the one or more freight units comprises one or more goods;
the shipping parameters comprise a weight, height, width, and depth for each of the one or more freight units; and the measurement system comprises a depth camera, a scale, a rangefinder, and an overhead mounting frame that comprises a plurality of overhead beams, wherein:
range data from the rangefinder are used to calibrate the depth camera;
the scale is located under the plurality of overhead beams; and
the depth camera of the measurement system comprises four or more downward-pointing depth cameras, wherein each of the four or more downward-pointing depth cameras is mounted on one of the plurality of overhead beams, such that when the one or more freight units is on the scale, the one or more freight units is within a field of view of each of the four or more downward-pointing depth cameras; and
a computer system that is in communication with the measurement system, wherein the computer system comprises:
a database that stores pricing rules for a plurality of freight carriers;
a client computer device; and
a host computer system that is in communication with the client computer device and the database,
wherein the computer system is configured to:
compute a density for each of the one or more freight units in the shipment based on the shipping parameters;
compute a shipping cost for shipping the shipment with each of the plurality of freight carriers based on carrier-specific pricing rules, stored in the database, for each of plurality the freight carriers, wherein computing the shipping cost for each of the freight carriers comprises determining, based on the carrier-specific pricing rules for the plurality of freight carriers, whether each of the plurality of freight carriers would designate the shipment as density-based or class-based for purposes of determining the shipping cost;
determine, by the host computer system, an adjustment to the shipping parameters for the shipment that reduces the shipping cost for at least one of the plurality of freight carriers by increasing the density of the one or more freight units, wherein the adjustment comprises an increase in at least a weight of the one or more freight units; and
transmit, by the host computer system to the client computer device, data about the adjustment prior to loading the shipment onto a carrier vehicle.

2. The system of claim 1, wherein the one or more goods are positioned on a pallet.

3. The system of claim 1, wherein:
the four or more downward-pointing depth cameras comprise an overhead downward-pointing depth camera and four side downward-pointing depth cameras;
the overhead downward-pointing depth camera is located directly overhead the scale such that overhead downward-pointing depth camera is directly overhead the one or more freight units when the one or more freight units are on the scale; and
each of the four side downward-pointing depth cameras are each located on a different side of the scale.

4. The system of claim 3, wherein the overhead downward-pointing depth camera and the four side downward-pointing depth cameras are at a same height level.

5. The system of claim 3, wherein the rangefinder comprises a plurality of rangefinders, wherein each of the plurality of rangefinders is a rangefinder selected from the group consisting of an optical rangefinder and an acoustic rangefinder.

6. The system of claim 5, wherein each of the plurality of rangefinders is mounted on one of the plurality of overhead beams overhead mounting frame, such that each of the plurality of rangefinders is adjacent to the overhead downward-pointing camera.

7. The system of claim 6, wherein:
the workstation combines point cloud threads from the four or more downward-pointing depth cameras to determine a composite point cloud for the one or more freight units; and
the computer system determines the height, width, and depth based on the composite point cloud.

8. The system of claim 1, wherein the client computer device executes an application to capture bill of lading information of the shipment to trigger the measurement system to determine the shipping parameters of the shipment.

9. The system of claim 8, wherein the client computer device comprises a display to display an annotated visualization of the one or more freight units, wherein the annotated visualization is captured by the depth camera, and wherein the annotated visualization indicates a confidence level of the determined shipping parameters.

10. The system of claim 1, further comprising a workstation located at a site of the overhead mounting frame, wherein the work station communicates with the host computer system and the client computer device via an application programming interface (API).

11. The system of claim 1, wherein the measurement system is further configured to recalibrate the scale based on a periodic monitoring of measurement system inputs, and wherein the recalibration is triggered based on a non-zero scale reading of the scale and detection that nothing is on the scale.

12. A method comprising:
determining, with a measurement system, shipping parameters for a shipment that comprises one or more freight units, wherein:
each of the one or more freight units comprises one or more goods;
the shipping parameters comprise a weight, height, width, and depth of each of the one or more freight units;
the measurement system comprises a depth camera, a scale, a rangefinder and an overhead mounting frame that comprises a plurality of overhead beams, wherein:
range data from the rangefinder are used to calibrate the depth camera;
the scale is located under the plurality of overhead beams, and wherein the depth camera of the measurement system comprises four or more downward-pointing depth cameras;
each of the four or more downward-pointing depth cameras is mounted on one of the plurality of overhead beams, such that when the one or more freight units is on the scale, the one or more freight units is within a field of view of each of the four or more downward-pointing depth cameras;
computing, by a computer system that comprises a host computer system, a client computer device, and a database that stores pricing rules for a plurality of freight carriers, and wherein a density for each of the one or more freight units in the shipment based on the shipping parameters;

computing, by the computer system, a shipping cost for shipping the shipment with each of the plurality of freight carriers based on carrier-specific pricing rules, stored in the database, for each of plurality the freight carriers, wherein computing the shipping cost for each of the freight carriers comprises determining, based on the carrier-specific pricing rules for the plurality of freight carriers, whether each of the plurality of freight carriers would designate the shipment as density-based or class-based for purposes of determining the shipping cost;

determining, by the computer system, an adjustment to the shipping parameters for the shipment that reduces the shipping cost for at least one of the plurality of freight carriers by changing the density of the one or more freight units, wherein the adjustment comprises an increase in weight, height, width and/or depth of the one or more freight units; and transmitting, by the computer system to the client computer device, data about the adjustment prior to loading the shipment onto a carrier vehicle.

13. The method of claim 12, wherein a system comprising the measurement system and computer system further comprises a light source to project light towards the depth camera to calibrate and align the depth camera.

14. The method of claim 12, wherein the depth camera comprises five depth cameras that each generates a point cloud thread.

15. The method of claim 14, wherein the host computer system uses a tolerance threshold to determine the point cloud thread used for determining the shipping parameters.

16. The method of claim 12, further comprising receiving, by the computer system, a signal from the client computer device to trigger measurement by the measurement system.

17. The method of claim 12, wherein the one or more goods are positioned on a pallet.

18. The method of claim 12, further comprising:

receiving, by the host computer system, a freight metric based on a database profile corresponding to the shipment; and changing, by the host computer system, the density of the one or more freight units, based on the received freight metric.

* * * * *